(12) United States Patent
Kosuge et al.

(10) Patent No.: US 9,175,712 B2
(45) Date of Patent: Nov. 3, 2015

(54) FIXING MEMBER AND MOUNTING STRUCTURE OF A PROXIMITY SENSOR

(75) Inventors: Eiichi Kosuge, Kanagawa (JP); Hideto Yonashiro, Kanagawa (JP)

(73) Assignee: NIPPON ALEPH CORPORATION, Kawasaki-shi (JP)

( * ) Notice: Subject to any disclaimer, the term of this patent is extended or adjusted under 35 U.S.C. 154(b) by 784 days.

(21) Appl. No.: 13/499,767

(22) PCT Filed: Oct. 2, 2009

(86) PCT No.: PCT/JP2009/067275
§ 371 (c)(1),
(2), (4) Date: Jun. 22, 2012

(87) PCT Pub. No.: WO2011/039892
PCT Pub. Date: Apr. 7, 2011

(65) Prior Publication Data
US 2012/0260751 A1    Oct. 18, 2012

(51) Int. Cl.
*F15B 15/28* (2006.01)
*F16B 35/00* (2006.01)
*F16B 7/14* (2006.01)
*F16B 21/02* (2006.01)
*H01H 36/00* (2006.01)

(52) U.S. Cl.
CPC .............. *F16B 35/005* (2013.01); *F16B 7/1472* (2013.01); *F15B 15/2892* (2013.01); *F16B 21/02* (2013.01); *H01H 36/00* (2013.01)

(58) Field of Classification Search
CPC .............. F16B 21/02; Y10T 403/4674; Y10T 403/4677; Y10T 403/7009; Y10T 403/7041; Y10T 403/7064; Y10T 403/7066; F15B 15/28; F15B 15/2815; F15B 15/2838
See application file for complete search history.

(56) References Cited

U.S. PATENT DOCUMENTS 5,142,834 A * 9/1992 Laclave et al. ................ 403/348
6,459,475 B1   10/2002 Fukui

FOREIGN PATENT DOCUMENTS

| CN | 2844853 Y | 12/2006 | |
|---|---|---|---|
| CN | 100402868 C | 7/2008 | |
| EP | 1 245 838 | * 2/2002 | .............. F16B 21/02 |

(Continued)

OTHER PUBLICATIONS

International Search Report of PCT/JP2009/067275, mailing date of Jan. 26, 2010.

(Continued)

*Primary Examiner* — Michael P Ferguson
(74) *Attorney, Agent, or Firm* — Westerman, Hattori, Daniels & Adrian, LLP

(57) ABSTRACT

A fixing member has a securing portion to be placed in a space formed between a first fixed area and a second fixed area, the second fixed area being placed facing opposite to and being apart from the first fixed area, having an opening, and not being allowed to displace relative to the first fixed area. The securing portion is formed in a shape rotatable with respect to the first fixed area around the rotational axis L that extends in a direction penetrating the opening, and has a first abutting portion abutting on the first fixed area and a plurality of second abutting portions at a plurality of positions on the circumference of the opening at the end. The plurality of the second abutting portions have inclined guide faces around the rotational axis L, the inclined guide faces inclining in circumferential direction.

9 Claims, 21 Drawing Sheets

(56) References Cited

FOREIGN PATENT DOCUMENTS

| | | |
|---|---|---|
| JP | 4-354606 A | 12/1992 |
| JP | 7-19603 U | 4/1995 |
| JP | 2799784 B2 | 9/1998 |
| JP | 11-294419 A | 10/1999 |
| JP | 2001-125276 A | 5/2001 |
| JP | 3407196 B2 | 5/2003 |
| JP | 2004-150517 A | 5/2004 |
| WO | 2007/059666 A1 | 5/2007 |

OTHER PUBLICATIONS

Chinese Office Action dated Dec. 25, 2013, issued in corresponding Chinese Patent Application No. 200980162739.X (10 pages).

* cited by examiner (a)

(b)

(a)

(b)

FIXING MEMBER AND MOUNTING STRUCTURE OF A PROXIMITY SENSOR

TECHNICAL FIELD

The present invention relates to a fixing member to be fixed between a pair of opposed fixed areas, one of the pair having an opening, a proximity sensor equipped with the fixing member, a mounting structure for the proximity sensor, a rotationally-connected structure, in which a first member and a second member are connected in relatively rotatable state, and a method of manufacturing the rotationally-connected structure.

BACKGROUND ART

According to the prior art, to fix various kinds of members to another member, a fixing member such as a screw is used, or a fixing means such as a threaded portion is provided directly on various kinds of members to use the various kinds of members themselves as fixing members.

For instance, as shown in FIG. 19, a proximity sensor 99 described in the following patent literature 1 has a structure with a lead switch 98 buried in soft resin 97 and a surface covered with hard resin 96.

To attach this proximity sensor 99 to, for example, an air cylinder, as shown in FIG. 20, a groove 94 with its cross section formed into an approximately round shape corresponding to the shape of the cross section of the proximity sensor 99 is formed on a mount 95 in advance, and the proximity sensor 99 is housed in this groove 94 and fixed using a screw 92. More specifically, before the proximity sensor 99 is placed in the groove 94, the screw 92 is inserted into a screw hole 93 formed at the front of the proximity sensor 99 and screwed to the extent that it does not get caught by the groove 94.

In this state, the proximity sensor 99 is inserted from an end 94a of the groove 94 and slid through the groove 94 to a desired detection point. At the same time, a protruding portion 99a of the proximity sensor 99 and a lead wire 91 are moved through an opening 90 of the groove 94. With the proximity sensor 99 accurately aligned at a desired detection point, the screw 92 is fastened to fix the sensor at that position.

As shown in FIG. 21, when the screw 92 is made to abut on the bottom 94b of the groove 94 and fastened, a reaction force of the screw 92 pushes up the proximity sensor 99 toward the opening 90, and an outer surface of the proximity sensor 99 with its cross section formed into an approximately round shape is pressed against a circumference of the opening 90 on the inner wall surface of the groove 94.

Then, when further fastened, the screw 92 is strongly pressed against the bottom 94b of the groove 94 by a screwing force against the screw hole 93; accordingly, the proximity sensor 99 is firmly fixed at the desired detection point.

CITATION LIST

Patent Literature

Patent Literature 1: JP 3407196B

DISCLOSURE OF INVENTION

Technical Problem

However, this structure of the prior art for fixing the proximity sensor 99 at a given point in the groove 94 from inside requires inserting the full length of the screw 92 into the proximity sensor 99 and screwing it deeply in the groove 94, and the screw 92 must be fastened again after positioning, which is troublesome attaching operation.

Moreover, this structure of the prior art has a disadvantage that to fix the proximity sensor 99 in the groove 94, the contour of the proximity sensor 99 must be formed larger than that of the opening 90 of the groove 94, while a sufficient clearance must be allowed between the contour of the proximity sensor 99 and the groove 94 and the opening 90. In addition to the limitation in the contour of the proximity sensor 99, the proximity sensor 99 must be inserted through the end 94a of the groove 94 and slid to a desired detection point, which is troublesome attaching operation.

In addition, with this structure of the prior art, since the proximity sensor 99 is used with the screw 92 inserted into its screw hole 93, the screw 92 screwed in the proximity sensor 99 may drop out of the screw hole 93 of the proximity sensor 99 if the screw 92 is left loosened, namely, is left in rotatable state, before attachment, for example, which is inconvenient.

These inconveniences are not limited to the case where the proximity sensor 99 is fixed in the groove 94 using the screw 92 from inside. Similar problems have occurred in a case, for instance, where various kinds of members are fixed in a hollow having an opening from inside and in a case where different kinds of fixing members are supported on another member in relatively rotatable state.

In the light of these disadvantages, a first objective of the present invention is to provide an easily detachable fixing member for fixing various kinds of members in a hollow having an opening from inside. A second objective of the present invention is to provide a proximity sensor easily detachable from the opening, when being attached to a hollow larger than the opening, and a mounting structure thereof. Third and fourth objectives of the present invention are to provide a rotationally-connected structure free from inconvenience of detachment of various kinds of members from other members, which may occur when various kinds of members are connected to other members in relatively rotatable state, and a method of manufacturing the same.

Solution to Problem

A fixing member achieving the first objective of the present invention is a fixing member having a securing portion fixed between a first fixed area and a second fixed area, the second fixed area facing opposite to and being spaced apart from the first fixed area and having an opening. The securing portion is formed into a shape rotatable around a rotational axis that passes through the opening; has a wide width portion where a distance between opposed positions on a plane orthogonal to the rotational axis is wider than the opening, and a narrow width portion where such distance is narrower than the opening; and has a first abutting portion abutting on the first fixed area, and second abutting portions formed in the wide width portion and abutting on the circumference of the opening of the second fixed area. Each of the plurality of second abutting portions has an inclined guide face that inclines in a circumferential direction with one rotational directional coming closer to the opening, and the fixing member is fixed when each of the inclined guide faces is pressed against the second fixed area by means of rotation with the first abutting portion abutting on the first fixed area.

The fixing member of the present invention has the wide width portion where the distance between opposed positions on a plane orthogonal to the rotational axis is wider than the opening, and the narrow width portion where such distance is narrower than the opening, and the wide width portion has the second abutting portions abutting on the circumference of the opening of the second fixed area. Consequently, when fastening various members in the opening and a hollow wider than the opening from inside, the securing portion can be inserted from the front side of the opening using the narrow width portion, whose width is narrower than that of other portions, and by rotating the securing portion, the second abutting portions are allowed to abut on the opening from inside.

Moreover, since each of the second abutting portions of the securing portion is equipped with an inclined guide face, by placing the securing portion between the first fixed area and the second fixed area and rotating the securing portion, the first abutting portion of the securing portion is allowed to abut on the first fixed area, and at the same time, the inclined guide faces are allowed to be pressed against the second fixed area, thereby enabling the securing portion to be fixed between the first fixed area and the second fixed area.

Thus, when fixing various kinds of members in the opening and the hollow wider than the opening from inside, there is no need to attach them from the end of the hollow, and thus easily detachable fixing member may be provided.

With the fixing member of the present invention, it is preferable that the inclined guide faces incline in a radial direction so that a position closer to the rotational axis comes closer to the opening. This enables the securing portion to shift to an appropriate position on the central side of the opening by the radial inclination of the inclined guide faces when they are pressed against the circumference of the opening of the second fixed area, and consequently, the securing portion is prevented from being fixed at an eccentric position relative to the opening. Thus, the fixing member having the securing portion may be easily fixed at the center of the opening.

With the fixing member of the present invention, a plurality of inclined guide faces are preferably formed at regular intervals in the circumferential direction. This enables the fixing member to be fixed by pressing each of the plurality of inclined guide faces against the circumference of the opening of the second fixed area, thereby facilitating alignment with the center of the opening.

The fixing member of the present invention has preferably an axis portion protruding from the securing portion along the rotational axis and having a circular cross-sectional shape. The axis portion can be used to enable the fixing member to be locked in flexibly rotatable state in various kinds of members, and thus the fixing member can be used to fix various kinds of members.

At the same time, if a housing hole is formed on various kinds of fixed members and the axis portion is housed in this housing hole, the securing portion can be supported by the housing hole when it is rotated, and the fixing member may be easily positioned at a given point prior to the fixing operation, which improves workability.

In particular, since there is no need to form threads on the axis portion or thread grooves in the housing hole of the fixed members, the housing hole can be formed small. In addition, since fixing is performed by exerting pressing force produced by the fixing member rather than screwing force produced by the screw, the strength of the circumference of the housing hole can be decreased. Thus, the width of the fixed member may be made smaller, achieving downsizing.

The proximity sensor of the present invention has a fixing member as described above, a proximity sensor body, which includes a housing hole for housing the axis portion of the fixing member in rotatable state, a first fixed area formed on one surface, and a detection face formed on the other surface.

With the proximity sensor of the present invention, since a switch body is fixed by a fixing member as described above, the first fixed area of the proximity sensor body is pressed by the first abutting portion by a response force produced when the inclined guide faces of the second abutting portions are pressed against the second fixed area. Consequently, mounting is allowed with the detection face pressed against an object to be detected, which ensures sufficient sensitivity to be obtained. Moreover, since scratches are rarely made on the surface of the object to be detected by fixing, it is unlikely that the sensitivity decreases even if fixing and release may be performed repeatedly.

Unlike the proximity sensor body of the prior art, the proximity sensor body of the present invention, which is fixed by being pressed against the securing portion of the fixing member, eliminates the need for forming a thread groove in the screw hole of the proximity sensor body. Consequently, the screw hole need not be formed wide to ensure the strength of the circumference. Thus, the proximity sensor body may be formed with its width kept narrow, which achieves thereby downsizing.

The width of the proximity sensor of the present invention on the detection face side is preferably made narrower than the opening.

In this way, by aligning the narrow width portion of the fixing member with the width direction of the proximity sensor, the whole width of the proximity sensor of the present invention can be made narrow, which facilitates insertion of the proximity sensor body and the fixing member into a space having an opening or a hollow wider than the opening, such as a long hole or groove, through the opening. Moreover, if the fixing member is rotated after being inserted into the space, the inclined guide faces may be positioned in the space wider than the largest width of the proximity sensor body. And the proximity sensor may be fixed with the inclined guide faces abutting on the circumference at the end of the opening. Thus, the proximity sensor can be inserted through the opening into a hollow having a width wider than the opening. Attachment can thus be facilitated.

The mounting structure of the present invention has the above-mentioned proximity sensor, and the opening and the hollow, whose width is wider than the opening, for housing the proximity sensor, and the hollow portion has a bottom formed on the side of the object to be detected and opposed to the opening. The proximity sensor body has a structure including a first fixed area on one side and a detection face on the other, the detection face being pressed against the bottom of the hollow for attachment.

With the mounting structure for the proximity sensor of the present invention, since the hollow has the bottom formed on the side of the object to be detected and opposed to the opening, and the detection face of the proximity sensor body abuts on the bottom of the hollow portion, the detection face of the proximity sensor body may be positioned in contact with the object to be detected, which ensures sufficient sensitivity.

Moreover, unlike the structure of the prior art, with the structure of the present invention, since the proximity sensor body is fixed by pressing its detection face against the bottom of the hollow rather than by means of a screw, scratches are not formed by the screw on the bottom. Thus, even though the proximity sensor body is detached/attached or aligned repeatedly, deterioration of detection accuracy due to scratches formed on the bottom of the hollow can be prevented without fail.

With the mounting structure of the proximity sensor, the detection face of the proximity sensor body is preferably formed into an inclined convex shape and the bottom of the hollow portion is preferably formed into a concave shape corresponding to the detection face. In this way, as a result of pressing the detection face of the proximity sensor body against the bottom of the hollow, the detection face of the proximity sensor body is guided to a given point at the bottom of the hollow. Accordingly, the detection face of the proximity sensor body is positioned in an appropriate position.

With the mounting structure of the proximity sensor, an elastic member is preferably inserted between the first fixed area and the first abutting portion, or between the detection face and the bottom. In this way, even though vibrations are caused to the portion to which the proximity sensor body is attached, the vibrations may be absorbed by an elastic force produced by the elastic member. Consequently, the proximity sensor body may be prevented from being loosened due to weakened fixing force of the fixing member after being attached.

The rotationally-connected structure of the present invention has a first member equipped with a head and an axis portion having a circular cross-sectional shape, and a second member for housing the axis portion in rotatable state formed in order that its end on the side of the head has a housing hole smaller than the head. The first member and the second member may be rotated relative to each other. The axis portion has a straight axis portion formed on the side of the head and a stopper axis portion having a diameter larger than that of the straight axis portion formed on the opposite side of the head of the straight axis portion. The housing hole has a straight support wherein the straight axis portion is mounted in slidable and rotatable state, and a stopper support wherein the stopper axis portion remains slidable.

With the rotationally-connected structure of the present invention, the first member has the head and the circular cross-sectional axis portion, the axis portion has the straight axis portion formed on the side of the head and the stopper axis portion formed on the opposite side of the head across the straight axis portion, its diameter being larger than that of the straight axis portion. Meanwhile, one end of the housing hole formed on the second member is smaller than the head and the straight axis portion is equipped with the straight support, wherein the straight axis portion is supported in slidable and rotatable state. Accordingly, when the axis portion of the first member is inserted into the housing hole of the second member, the second member may be supported in rotatable state by the axis portion, and the head and the stopper axis portion control the movement of the second member toward both sides in the axial direction. Thus, the rotatable first member can be prevented from being detached from the second member without fail.

It is preferable that the stopper axis portion is formed into a tapered shape with its diameter increasing from the head in the direction getting away from the head, and that the stopper support is formed into a shape corresponding to the tapered shape of the stopper axis portion. In this way, even if there is only a slight difference between the distance from the head of the axis portion to the stopper support and the distance from the end of the housing hole to the stopper support, sliding is allowed. The simple structure thus allows the first member and the second member to rotate relative to each other with the displacement in the axial direction minimized.

Moreover, if the stopper portion and the stopper support are in a tapered shape, only by leaving a slight gap, the whole surfaces of the tapered portions can be detached from each other, thereby minimizing sliding resistance.

With the rotationally-connected structure of the present invention, the second member may be a rotating member to be attached to the mount in freely rotatable state, and the first member may be a support means for supporting the rotating member in freely rotatable state including a fixing portion for fixing the member to the mount.

With the rotationally-connected structure of the present invention, the second member may be a member to be fixed to the mount, and the first member may be a fixing member for fixing the member to be fixed to the mount including a fixing portion for fixing the member to the mount.

With the rotationally-connected structure of the present invention, the fixed member may be a proximity sensor body having a detection body for detecting an object to be detected in the mount and a resin sealing portion for sealing the detection body, with the fixing member supported on the resin sealing portion in freely rotatable state.

A method of manufacturing the rotationally-connected structure of the present invention includes: a first member manufacturing process for manufacturing the first member, the first member including a head and a circular cross-sectional axis portion, and the axis portion including a straight axis portion formed on the side of the head and a stopper axis portion having a diameter larger than that of the straight axis portion formed on the side opposite to the head; a second member manufacturing process for manufacturing a molded body with the second member bonded to the axis portion of the first member, wherein using a mold having a cavity corresponding to the outer shape of the second member, the head of the first member is detached from the cavity, the first member is placed in a state where the stopper axis portion is placed within the cavity, and resin is formed within the cavity; and a detaching step for obtaining a rotationally-connected structure by applying relative pressure to the first member and the second member of the molded body, thereby detaching the bonded state between the axis portion and the second member.

According to the method of manufacturing the rotationally-connected structure of the present invention, the first member having the head, the straight axis portion, and the stopper axis portion is manufactured in the first member manufacturing process; and in the second manufacturing process, the head of the first member is detached from the cavity of the mold and the resin is formed with the stopper axis portion placed within the cavity; and then the head of the first member is pressurized to detach the first member from the second member to allow them to rotate relative to each other. Consequently, the rotationally-connected structure, in which the first and the second members are allowed to rotate relative to each other, can be manufactured without performing the work for connecting the second member to the first member in rotatable state. The manufacturing process of the rotationally-connected structure and workload can thus be minimized to facilitate manufacturing.

According to the method of manufacturing the rotationally-connected structure of the present invention, the mold preferably has a solid structure for forming a gap on the face of the mold opposite to the axis portion of the first member.

In this way, a gap may be formed in a position adjacent to the first member in the axial direction in the molded body obtained in the second member manufacturing process. Consequently, when releasing the bonded state by pressurizing the head of the first member, the axis portion of the first member may easily move into the space of the molded body and bonded state can thus be released easily.

According to the method of manufacturing the rotationally-connected structure of the present invention, the stopper axis portion is preferably formed in a tapered shape with its diameter increasing from the head in a direction getting away from the head.

In this way, only by moving the first member from the second member slightly, the bonded state may be released to the extent that the first and the second members rotate relative to each other.

REFERENCE SIGN LIST

Figure 1:
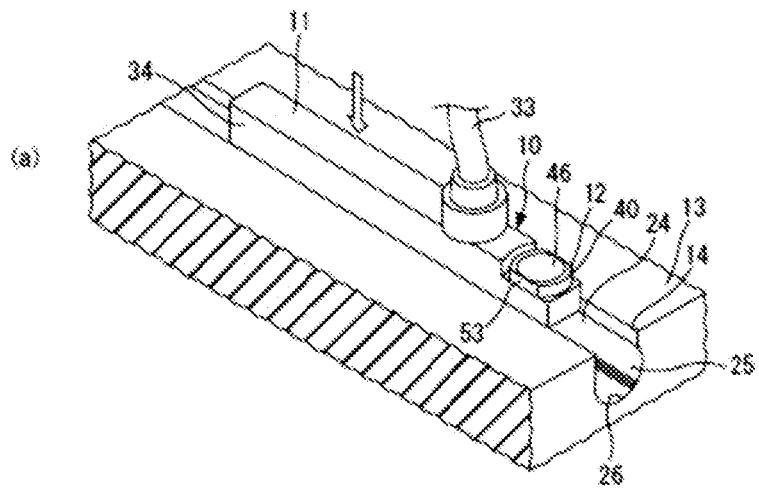
FIG. 1 presents perspective views of a mounting structure for a proximity sensor according to a first embodiment of the present invention, wherein (a) shows the process of mounting the proximity sensor, and (b) shows the proximity sensor being attached.
Figure 1:
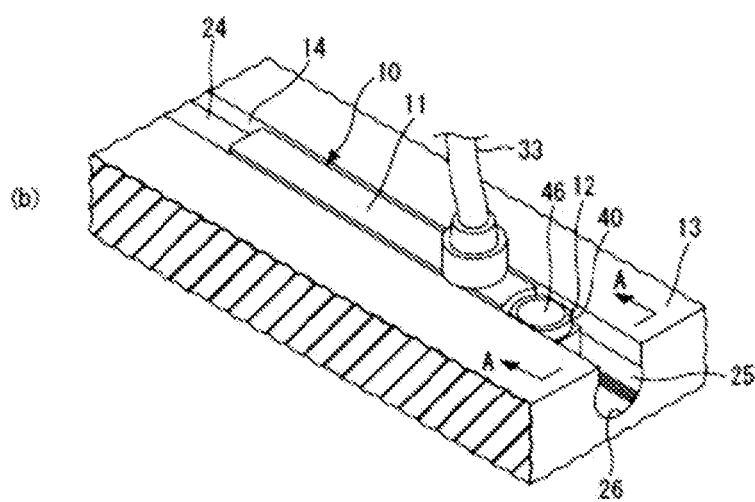

10 Proximity sensor
11 Proximity sensor body
12 Fixing member
13 Mount
14 Groove
21 First fixed area
22 Second fixed area
23 Space
24 Opening
25 Hollow
26 Bottom
27 Axis portion
28 Housing hole
31 Lead switch
32 Substrate
33 Lead wire
34 Resin sealing portion
36 Hanger body
37 Hook portion
38 Hanger
39 Boss
40 Securing portion
41 Detection face
42 Inclined guide face
46 Central portion
47 Wide width portion
51 First abutting portion
52 Second abutting portion
53 Chamfer
54 Straight support
55 Stopper support
56 Straight axis portion
57 Stopper axis portion
60 Mold
61 Intermediate structure
62 Cavity
63 Solid-shaped portion
64 Resin
65 Molded body
67 Rail
68 Hook member
69 Hook
72 Electric bulb
73 Connecting hole
74 Socket
75 Socket electrodes
76 Projection
77 Connection
78 Electric bulb electrodes
81 Caster
82 Caster body
83 Caste axis
85 Head
86 Male screw
87 Lever 88 Member to be fixed
89 Driver clamping portion
L Rotational axis

DESCRIPTION OF EMBODIMENTS

Some of the embodiments of the present invention will hereinafter be described in detail by referring to the drawings.

First Embodiment

FIGS. 1 to 7 show the first embodiment.

Figure 2:
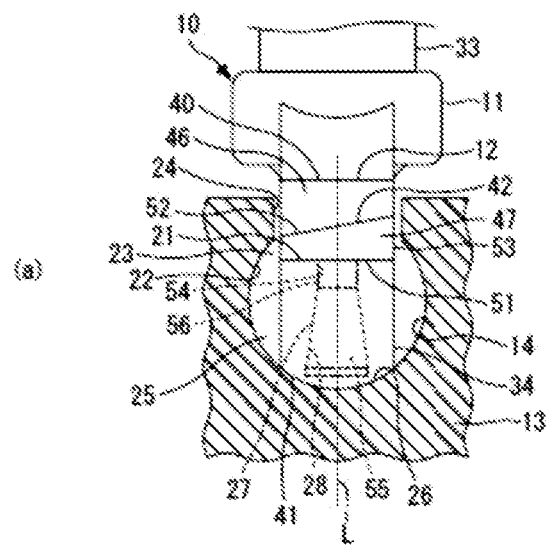
FIG. 2 (a) is a sectional diagram viewed from line A-A in FIG. 1 (b) showing the state of the mounting structure of the proximity sensor according to the first embodiment before attachment, and FIG. 2 (b) is a sectional diagram viewed from the line A-A of FIG. 1 (b) showing the state after attachment.
Figure 2:
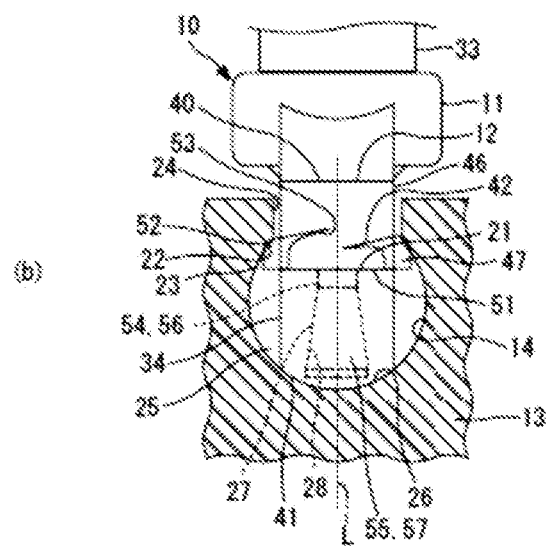

In the first embodiment, the proximity sensor 10 having a proximity sensor body 11 and a fixing member 12, and a mounting structure with the proximity sensor 10 attached on a mount 13, as shown in FIGS. 1 and 2, will be described. Herein, the fixing member is a member to be fixed to another member, and in this embodiment, it is a member used for fixing various members to another member. The proximity sensor is a device for detecting the position of an object to be detected in non-contact state, and emits electrical signals according to detection results.

With the mounting structure according to the first embodiment, the proximity sensor 10 is attached to the mount 13 containing the object to be detected. The mount 13 containing the object to be detected is defined as the mount wherein the object, whose position can be detected by the proximity sensor 10, is attached in displaceable state. The object to be detected may be contained in or externally mounted on the mount 13.

A hydro-pneumatic cylinder, for example, is structured with a piston or a cylinder as an object to be detected mounted to a cylinder block as the mount 13 in relatively displaceable state, in order that the position of the piston can be detected by attaching a proximity sensor 10 to the outer surface of the cylinder block.

With this mounting structure, the mount 13 has a groove 14 wherein the proximity sensor body 11 is housed, and the proximity sensor body 11 is fixed from inside by the fixing member 12 using a first fixed area 21 formed on the top face of the proximity sensor body 11 and a second fixed area 22 formed within the groove 14.

According to the first embodiment, the first fixed area 21 and the second fixed area 22 are formed at areas facing opposite to and being spaced apart from each other to disable relative displacement in the height direction, and a space 23 for placing the fixing member 12 is formed between these areas.

The groove 14 of the mount 13 has an opening 24 extending on the surface of the mount 13 in one direction, and a hollow 25 having a width larger than the opening 24. In this case, the hollow 25 is formed to have an approximately circular cross-sectional shape having a diameter larger than the opening 24. Accordingly, the bottom 26, which is on the side of the object to be detected facing opposite to the opening 24, has a curved surface having approximately constant arc shape in the longitudinal direction of the groove 14.

The second fixed area 22 of the groove 14 is formed in the inner circumference at the end of the opening 24. The inner circumference at the end of the opening 24 may be formed in a position adjacent to the opening 24 or in a position apart from the position adjacent to the opening 24. The second fixed area 22 may be formed on a plane orthogonal to the direction of the rotational axis, namely the attaching direction of the fixing member 12, but in this embodiment, it is formed on an inclined plane or a curved surface.

Figure 3:
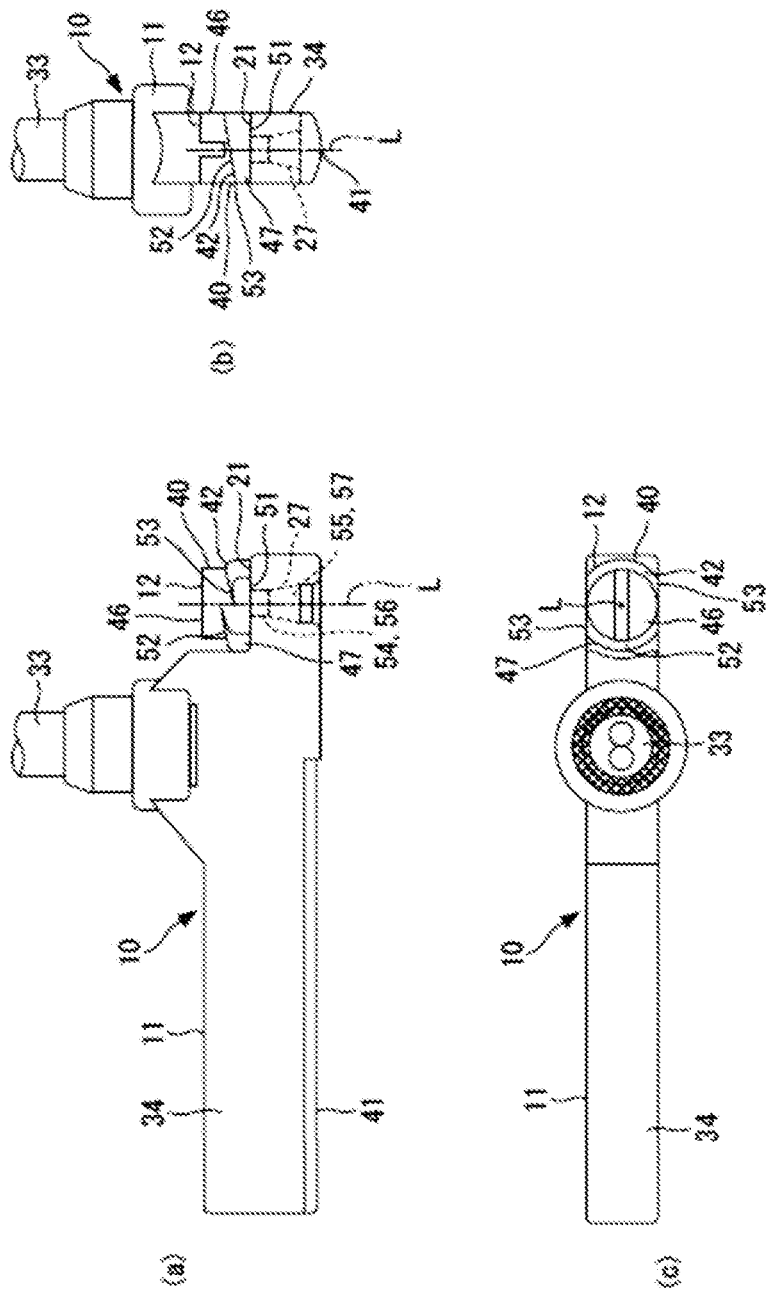
FIG. 3 (a) is a front view, FIG. 3 (b) is a side view, and FIG. 3 (c) is a plan view of the proximity sensor according to the first embodiment.
Figure 4:
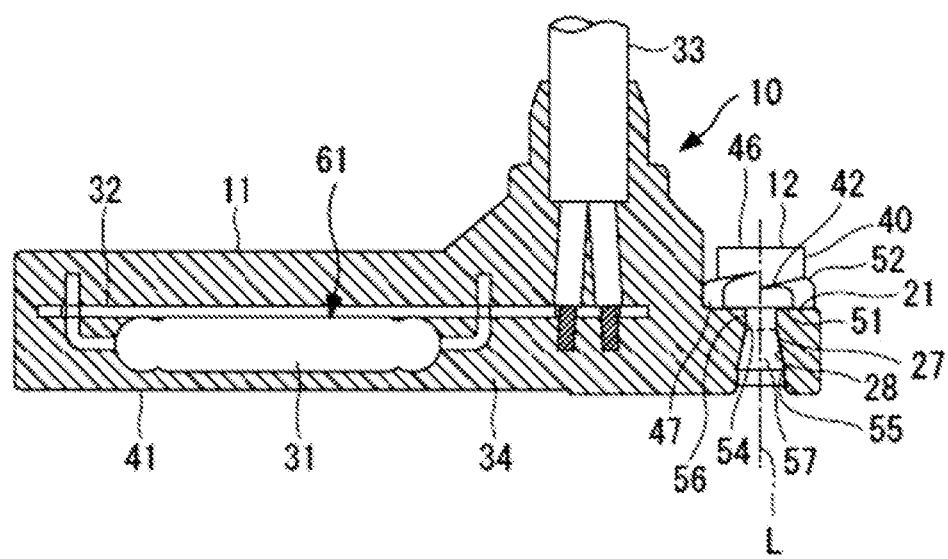
FIG. 4 is a sectional view of the proximity sensor according to the first embodiment.

The proximity sensor 10 has the proximity sensor body 11 and the fixing member 12 for attaching the proximity sensor body 11 to the mount 13 as shown in FIGS. 3 and 4. The fixing member 12 is supported on the proximity sensor body 11 as a result of the axis portion 27 being housed in rotatable state in the housing hole 28 formed on one end of the proximity sensor body 11.

With the proximity sensor body 11, a lead switch 31 as a detection body for detecting the object to be detected is supported on a substrate 32, a lead wire 33 is fixed on the substrate 32 to electrically connect to the lead switch 31; the lead switch 31, the substrate 32, and the end of the lead wire 33 are buried in the resin sealing portion 34; and the lead wire 33 extends from the resin sealing portion 34.

There is no limitation to the resin of the resin sealing portion 34 because substantial strength for attachment need not be ensured, unlike the resin sealing portion according to the prior art, but the resin unsusceptible to deformation even if it is maintained in the groove 14 of the mount 13 in pressurized state for a long time is preferable. For example, various kinds of thermoplastic resins and thermosetting resins may be used.

With the resin sealing portion 34 of the proximity sensor body 11, a housing hole 28 for supporting the fixing member 12 in rotatable state is formed penetrating vertically at a position further ahead of the lead wire 33. The housing hole 28 is formed smaller than a securing portion 40 as the head of the fixing member 12, which will be described later. The circumference of the top face forming the housing hole 28 serves as the planer first fixed area 21.

On the other hand, since the lead switch 31 is placed on the lower side, a wide range of the bottom surface on the other side of the resin sealing portion 34 serves as the detection face 41. The detection face 41 is in an inclined convex shape corresponding to the concave shape of the bottom 26 of the groove 14.

The width of the resin sealing portion 34 lower than the first fixed area 21 down to the detection face 41 is narrower than that of the opening 24 of the groove 14. Consequently, the whole part lower than the fixing member 12 abutting on the first fixed area 21 down to the detection face 41 can be housed in the groove 14.

Figure 5:
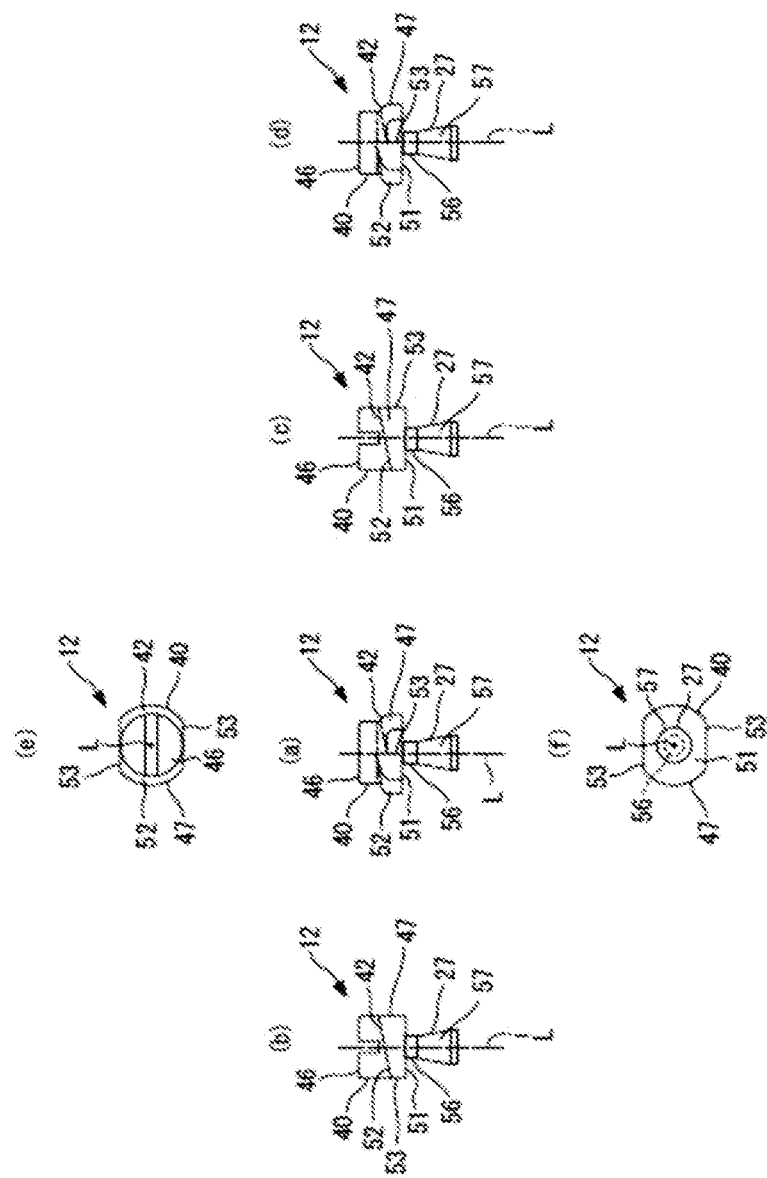
FIG. 5 (a) is a front view, FIG. 5 (b) is a left side view, FIG. 5 (c) is a right side view, FIG. 5 (d) is a rear view, FIG. 5 (e) is a plan view, and FIG. 5 (f) is a bottom view of the fixing member according to the first embodiment.
Figure 6:
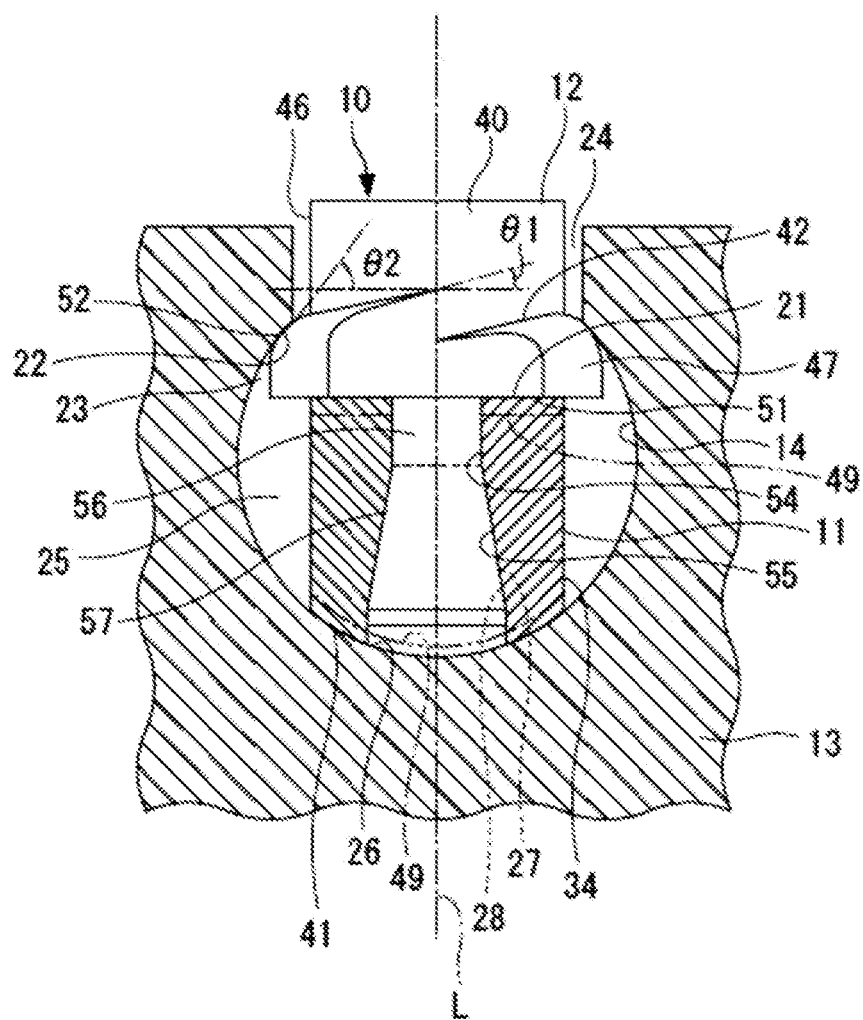
FIG. 6 is a sectional view showing the process of attaching the proximity sensor according to the first embodiment to the mounting structure.

As shown in FIGS. 5 and 6, the fixing member 12 has the securing portion 40 as the head inserted and fixed in the space 23, and the axis portion 27 having a circular cross-sectional shape and protruding from the securing portion 40 along the rotational axis L.

The securing portion 40 is formed in a shape rotatable relative to the first and second fixed areas around the rotational axis L that extends in a direction penetrating the opening 24, and contains a central portion 46 and a wide width portion 47, the wide width portion being formed into a stepped shape laterally protruding from the side circumference of the central portion 46 and having a distance between the opposite positions on a plane orthogonal to the rotational axis L wider than the width of the opening 24.

In the securing portion 40, the side of the first fixed area 21 of the proximity sensor body 11 is the first abutting portion 51 formed into a planar shape. The surface of the wide width portion 47 on the side of the opening 24 serves as the two second abutting portions 52, which abut on the opening 24.

To each of the second abutting portions 52, an inclined guide face 42 that inclines in a circumferential direction, with one rotational directional coming closer to the opening 24 and with the side closer to the rotational axis L coming closer to the opening 24, is provided around the rotational axis L. Each of the inclined guide faces 42 is preferably formed around the rotational axis L within a region equivalent to half-turn or smaller. If the inclined guide faces 42 are formed larger than the half-turn region, it becomes difficult to form circumferential inclination uniform, thus making it hard to allow the securing portion 40 to be fastened with each of the inclined guide faces 42 abutting on the second abutting portion 52 in good balance.

In this case, the inclined guide faces 42 are preferably formed into the same shape, placed at regular intervals in circumferential direction, and formed symmetrically with respect to the rotational axis L. If they are formed asymmetrically, the securing portion cannot be fixed in good balance.

When the first abutting portion 51 is made to abut on the first fixed area 21, it is necessary that the lowest position of the inclined guide faces 42, namely the position on the side of the axis portion 27, comes at a position lower than the second abutting portions 22 and that the highest position comes at a position higher than the second abutting portions 22.

The circumferential inclination θ1 of each of the inclined guide faces 42 may be selected as required, but it is desirable that inclination fall within a range from 1° to 89°, more preferably from 5° to 15°. If the circumferential inclination of the inclined guide faces 42 is too large, torque tends to be applied in a direction releasing the abutment due to reaction force generated when the inclined guide faces are pressed against the opening 24, thereby making it difficult to maintain the state of abutment. Meanwhile, if the inclination is too small, the angle of rotating the securing portion 40 becomes large at the time of attachment, thereby decreasing operability.

These inclined guide faces 42 preferably have the same circumferential inclination θ1. This enables each of the abutting portions 52 to easily abut on the opening 24 of the second fixed area 22 under the same contact pressure when the securing portion 40 is rotated. Consequently, the securing portion 40 can be fixed in good balance.

On the other hand, the radial inclination θ2 of the portions of the inclined faces 42 pressed against the end of opening 24 may also be selected as required. For example, the inclination can be set larger than the circumferential inclination θ1 within a range smaller than 90°. If this inclination is steep, the force applied in the horizontal direction can be increased when the inclined guide faces are pressed against the second fixed area 2, thereby ensuring high level of alignment operation of the securing portion 40, but adjustment range tends to be narrow. Meanwhile, if the inclination is gentle, the force applied in the horizontal direction becomes small, making it difficult to ensure sufficient alignment operation.

The radial inclination θ2 of the inclined guide faces 42 may be the same as or different from the inclination of the circumference of the opening 24 at the end, against which each of the inclined guide faces 42 is pressed. If inclinations are different, the contact area decreases, thereby decreasing sliding resistance.

The radial inclination θ2 may be maintained uniform in the radial direction, but in this embodiment, a curved shape is formed in order that the inclination on the peripheral side of the radial direction becomes larger.

In this securing portion 40, a pair of chamfers 53 are formed in parallel to each other at a pair of opposed positions on a plane orthogonal to the rotational axis L between the two inclined guide faces 42, as a narrow width portion, wherein the distance between the opposed positions on a plane orthogonal to the rotational axis L is shorter than the width of the opening 24. By forming such chamfers 53, once the chamfers 53 are aligned with the edges of the opening 24 of the groove 14, the side of the wide width portion of the securing portion 40 can be made to pass easily through the opening 24 of the groove 14.

Meanwhile, the axis portion 27 of the fixing member 12 has a straight axis portion 56 formed on the side of the securing portion 40, and a stopper axis portion 57 having a diameter larger than that of the straight axis portion 56 formed on the side opposite to the securing portion 40 across the straight axis portion 56. The cross section of the straight axis portion 56 orthogonal to the rotational axis L is in a uniform circular shape. The cross section of the stopper axis portion 57 orthogonal to the rotational axis portion L may be in a uniform circular shape having a diameter larger than that of the straight axis portion 56, but in this embodiment, the stopper axis portion is formed in a tapered shape having circular cross section in order that its diameter gradually increases from the side of the straight axis portion 56 toward the end, namely in a direction getting away from the securing portion 40.

The housing hole 28 of the proximity sensor body 11 for supporting the axis portion 27 of such fixing member 12 is manufactured by a method to be described later, and consequently has a straight support 54 for housing the straight axis portion 56 in slidable and rotatable state, and a stopper support 55 formed into a shape corresponding to the tapered shape of the slidable stopper axis portion 57.

Materials used for the fixing member 12 are not limited to specific materials, but those unsusceptible to deformation even if maintained in the state of abutment for a long time are preferable. For example, any metals such as iron, copper, and aluminum or resins such as engineering plastic may be used.

A method of manufacturing the above-mentioned proximity sensor 10 will hereinafter be described.

To manufacture the proximity sensor 10, an intermediate structure 61, wherein a lead switch 31 is supported by a substrate 32 and a lead wire 33 is fixed to the substrate 32 to establish electrical connection with the lead switch 31, as shown in FIG. 4, is manufactured in advance.

Meanwhile, as shown in FIG. 5, a fixing member 12, including; a straight axis portion 56, which has a securing portion 40 as a head and an axis portion 27 having circular cross-sectional shape, the axis portion 27 being formed on the side of the securing portion 40; and a stopper axis portion 57 formed on the straight axis portion 56 on the side opposite to the securing portion 40 across the straight axis portion 56 and having a diameter larger than the straight axis portion 56, is prepared using an appropriate method such as molding, machining, and forging (a first member manufacturing process).

Figure 7:
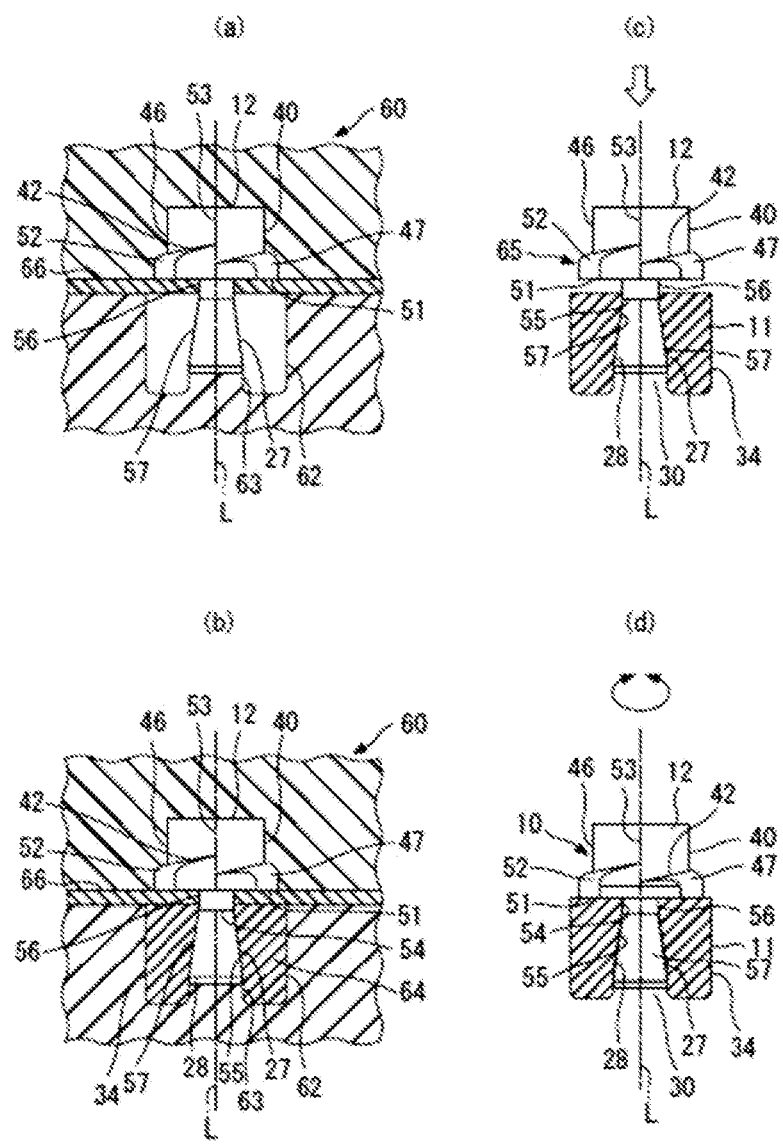
FIG. 7 presents a manufacturing process of the proximity sensor according to the first embodiment, wherein (a) is a sectional view showing the state where the fixing member is placed in the mold, FIG. 7 (b) is a sectional view showing the molded state, FIG. 7 (c) is a sectional view showing the molded body, and FIG. 7 (d) is a sectional view of the proximity sensor.

Then, as shown in FIG. 7 (a), the fixing member 12 is inserted into a mold 60 having a cavity 62 corresponding to the contour of the proximity sensor body 11, with the securing portion 40 of the fixing member 12 detached from the cavity 62 and the stopper axis portion 57 placed within the cavity 62. To detach the securing portion 40 from the cavity 62, a sliding plate 66 that can be opened and closed is inserted between the cavity 62 and the first abutting portion 51 of the securing portion 40. At the same time, a given portion of the intermediate structure 61 manufactured in advance is placed within the cavity 62.

In this mold 60, a solid-shaped portion 63 having a cross-sectional shape corresponding to the largest cross section of the axis portion 27 is formed at a given position of a mold face opposed to the stopper axis portion 57 of the fixing member 12 and the rotational axis L, and by performing clamping with the fixing member 12 placed in position, the stopper axis portion 57 of the fixing member 12 and the solid-shaped portion 63 are arranged in position contacting each other. The solid-shaped portion 63 may be an insert made of a material different from that of the mold 60, but in this embodiment, it is a convex portion integrated into the mold 60 so as to protrude from the inner wall of the cavity 62 of the mold 60.

After the mold 60 is clamped, insert-molding is performed by injecting resin 64 into the cavity 62, as shown in FIG. 7 (*b*), to form a resin sealing portion 34 of the proximity sensor body 11 (a second member manufacturing process).

In this way, a molded body 65, including the resin sealing portion 34 connected to the fixing member 12, with the intermediate structure 61 and a part of the axis portion 27 of the fixing member 12 buried therein, is formed as shown in FIG. 7 (*c*). In this case, a gap 30 having a cross-sectional shape corresponding to the largest cross-sectional shape of the axis portion 27 is formed adjacent to the stopper axis portion 57 in the axial direction.

The molded body 65 produced in the second member manufacturing process is removed from the mold 60, and in a state where the proximity sensor body 11 is fixed, impact is applied, for example, to pressurize the securing portion 40 of the fixing member 12 toward the side of the stopper axis portion 57 along the rotational axis L. Then the connection between the stopper axis portion 57 and the resin 64 is released, and the manufacture of the proximity sensor 10 as shown in FIG. 7 (*d*), wherein the proximity sensor body 11 and the fixing member 12 are connected within the housing hole 28 in relatively rotatable state, is completed (a releasing step).

A method of attaching the proximity sensor 10 manufactured in this way will be described below.

To attach the proximity sensor 10 in the groove 14 of the mount 13, the fixing member 12 is rotated within the housing hole 28 relative to the proximity sensor body 11, as shown FIG. 1 (*a*) and FIG. 2 (*a*), to align the chamfer 53 of the securing portion 40 in the width direction of the proximity sensor body 11 in order that the width of the entire proximity sensor 10 becomes narrow. In that state, the proximity sensor body 11 is inserted into the groove 14 from the opening 24, with the detection face 41 of the proximity sensor body 11 facing the bottom 26.

Then, in a state where the detection face 41 is contacting the bottom 26 of the groove 14, the securing portion 40 is rotated relative to the proximity sensor body 11. Then, the inclined guide faces 42 of the securing portion 40 abut on the second fixed area 22 of the opening 24 by means of the inclination in the circumferential direction, and by means of the reaction force produced, the first abutting portion 51 of the securing portion 40 abuts on the first fixed area of the proximity sensor body 11.

Then, when the securing portion 40 is further rotated, the contact pressure between the inclined guide faces 42 and the second fixed area 22 on the circumference of the opening 24 at the end portion increases by mean of the circumferential inclination of the inclined guide faces 42. Then, depending on the radial inclination of the inclined guide faces 42, a force is applied to the securing portion 40 toward the center of the opening 24 due to a lateral component of the response force exerted by the second fixed area 22. In this way, even if the securing portion 40 is inserted in a position deviated from the center of the groove 14 in the width direction, this force allows the securing portion to shift toward the center. As a result of contact between each inclined guide face 42 and the second fixed area 22 on both sides of the opening 24, lateral forces facing opposite to each other are applied, thereby aligning the securing portion 40.

At the same time, by means of the reaction force produced when each of the inclined guide faces 42 presses the second fixed area 22, the first abutting portion 51 of the securing portion 40 presses the first fixed area of the proximity sensor body 11. Accordingly, the detection face 41 of the proximity sensor body 11 is pressed against the bottom 26 of the groove 14. Consequently, since the detection face 41 and the bottom 26 of the groove 14 respectively have a convex shape and a concave shape matching with each other, they are aligned at the bottom 26, the securing portion 40 is also aligned, and accordingly, the entire proximity sensor 10 is aligned at the center of the groove 14.

Moreover, as shown in FIG. 1 (*b*) and FIG. 2 (*b*), by rotating the securing portion 40 sufficiently relative to the proximity sensor body 11, thereby allowing each inclined guide face 42 to press against the second fixed area 22 securely and allowing the first abutting portion 51 of the securing portion 40 to press against the first fixed area 21, attachment of the proximity sensor 10 is completed. It should be noted that the distance of rotation of the securing portion 40 relative to the proximity sensor body 11 is dependent on the circumferential inclination of the inclined guide faces 42 and the size of the space 23, is half-turn (180°) at the maximum, and the shorter the better. It is preferable that the total rotation distance of the securing portion 40 from the position where the proximity sensor 10 is inserted into the groove 14 from the opening 24 by, for instance, 1/10- to 4/10-turn, preferably 1/6- to 5/6-turn, further preferably 1/8- to 3/8-turn, especially, and most desirably 1/4-turn.

Although not compulsory, an elastic member made of various kinds of elastomeric materials may be inserted between the first fixed area 21 and the first abutting portion 51 or between the detection face 41 and the bottom 26 as shown by the imaginary line in FIG. 6 to prevent the fixing member 12 from being loosened due to vibrations.

According to the fixing member 12 used in the mounting structure of the proximity sensor 10, since the circumferentially-inclined guide faces 42 are formed on the plurality of second abutting portions 52 of the securing portion 40 around the rotational axis L, by placing the securing portion 40 between the first fixed area 21 and the second fixed area 22 and rotating the securing portion, the distance between the first abutting portion 51 to each position of the inclined guide faces 42 increases or decreases along the circumferential direction of the inclined guide faces 42.

In this way, as a result of rotating the securing portion 40, the first abutting portion 51 of the securing portion 40 is allowed to abut on the first fixed area 21, and the inclined guide faces 42 are allowed to press against the second fixed area 22. Consequently, the securing portion 40 can be fixed between the first fixed area and the second fixed area.

In addition, since the wide width portion 47 where the distance between the opposed positions on a plane orthogonal to the rotational axis L is wider than the opening and chamfers 53 where such distance is narrower than the opening 24 are provided, and the wide width portion 47 includes the second abutting portions 52 abutting on the circumference of the opening 24, the securing portion 40 can be inserted from the front side of the opening 24 using the chamfer 53 having a width narrower than other portions, and at the same time, by rotating the securing portion 40, the inclined guide faces 42 are allowed to abut on the opening 24 from inside, ensuring easy fixing operation using the fixing member 12.

According to this embodiment, since the inclined guide faces 42 are opposed to the opening 24 and the circumference of the opening 24 and inclined radially, once the inclined guide faces 42 are pressed against the second fixed area 22 on the circumference of the opening 24, the securing portion 40 can shift to an appropriate position on the central side of the opening 24 by means of the inclination of the inclined guide faces 42, and thereby the securing portion is prevented from being fixed deviated from the opening 24. It is therefore possible to fasten the fixing member 12 having the securing portion 40 easily at the center of the opening 24.

According to this fixing member 12, since the plurality of inclined guide faces 42 are formed at regular intervals in the circumferential direction and symmetrically with respect to the rotational axis L, the distance from the first abutting portion 51 to each position of the inclined guide faces 42 can be made uniform, and at the same time, the radial inclinations of the plurality of inclined guide faces 42 at radial positions from the rotational axis L can also be made uniform. Consequently, by allowing the inclined guide faces 42 of the securing portion 40 to abut on and press against the circular opening 24, more accurate alignment at the center is ensured.

According to this fixing member 12, since the axis portion 27, which protrudes from the securing portion 40 along the rotational axis L and has circular cross-sectional shape, is provided, the fixing member 12 can be placed in the proximity sensor body 11 in flexibly rotatable state using this axis portion 27. At the same time, by retaining the axis portion 27 in a housing hole 28 provided in the proximity sensor body 11, the axis portion 27 can be supported by the housing hole 28 when the securing portion 40 is rotated, which facilitates rotation. In addition, since the fixing member 12 can be placed at a given position easily before fastening, workability improves significantly.

In this embodiment, by forming the housing hole 28 for housing the axis portion 27 in rotatable state in the proximity sensor body 11, housing various members together with the fixing member 12 within the opening 24 and the space 23 having width wider than the opening 24, and rotating the securing portion in this state, various members can be pressed against the bottom 26 and fastened.

In particular, since there is no need to form a thread groove on the inner surface of the housing hole 28 of the proximity sensor body 11, the housing hole 28 can be formed small. In addition, since the proximity sensor body 11 is fixed not by screwing but by pressing the body from one side to the other, the strength of the circumference of the housing hole 28 can be decreased, and the width of the proximity sensor body 11 can thus be downsized.

According to the mounting structure for the proximity sensor 10 described above, since the proximity sensor body 11 is fixed using the specific fixing member 12, once the inclined guide faces 42 at the second abutting portions 52 of the fixing member 12 are made to press against the second fixed area 22, the first abutting portion 51 is pressed against the first fixed area 21 of the proximity sensor body 11 by means of reaction force produced, and thus the proximity sensor can be fixed with its detection face 41 on the other side pressed against the side of an object to be detected. Mounting with the detection face 41 closely attached to the object to be detected is thus facilitated, and sufficient sensitivity can thus be ensured.

Figure 20:
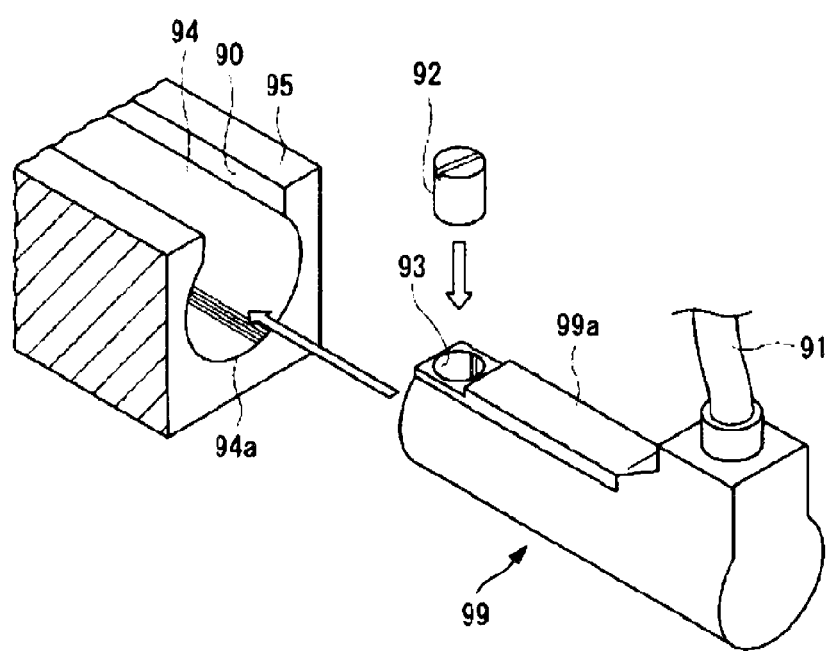
FIG. 20 is an exploded perspective view of the mounting structure according to prior art.
Figure 21:
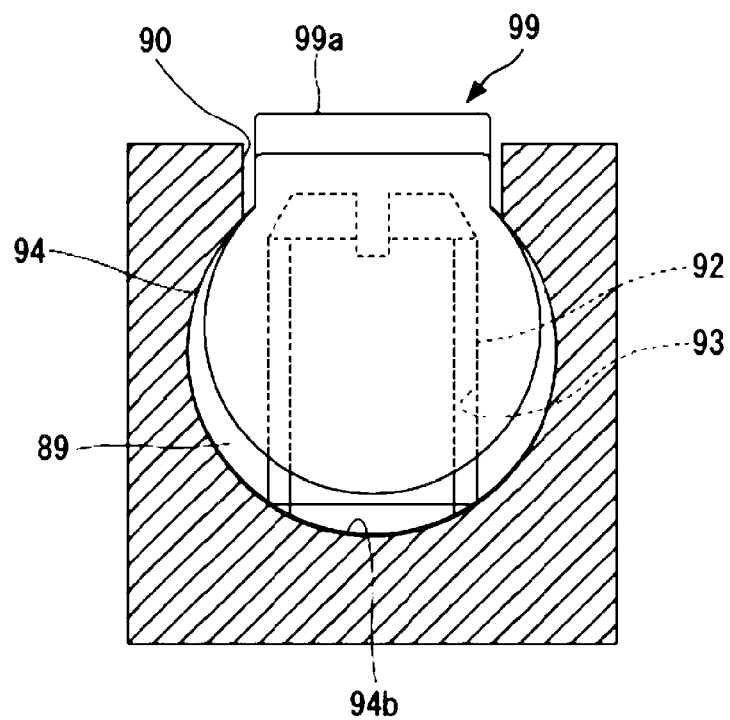
FIG. 21 is a sectional view of the mounting structure for the proximity sensor according to prior art.

More specifically, with a proximity sensor 99 according to the prior art as shown in FIG. 20 and FIG. 21, when the proximity sensor 99 is fixed within a groove 94 by fastening a screw 92, the detection face of the proximity sensor 99 on one side in the longitudinal direction goes up from the bottom 94b of the groove 94, the distance between each position of the proximity sensor 99 and the object to be detected varies, and consequently the sensitivity decreases, causing displacement in the optimum detection position. Consequently, even if a user performs alignment at the optimum position within the groove 94, after the proximity sensor 99 is fixed, the sensitivity decreases and the detection position deviates, making it difficult to detect the object to be detected in an optimum state.

Meanwhile, with the proximity sensor 10 according to this embodiment, if alignment is performed within the groove 14 first and then the sensor is fixed using the fixing member 12, fixing can be performed with the detection face 41 pressed against the side of the object to be detected within the groove 14, the detection face does not goes up, or sensitivity and detection position do not change between before and after the fixing of the proximity sensor 10.

In addition, if the detection face 41 is pressed against the bottom 26 of the groove 14 before fixing, fixing is performed in a state where the detection face 41 is contacting the bottom 26 of the groove 14 and pressed, scratches are not made on the bottom 26 by fixing. Thus, even if the proximity sensor 10 is fixed and released repetitively, there is no possibility that the proximity sensor 10 is fixed with the detection face 41 contacting scratches on the bottom 26 of the groove 14. Consequently, decrease in sensitivity can be prevented.

Furthermore, since the proximity sensor body 11 is fixed by pressing the securing portion 40 of the fixing member 12, there is no need, unlike prior art, to form a thread groove within the inner surface of the hole of the proximity sensor body 11, or the proximity sensor body need not be formed wide to ensure the strength around the groove. Thus, the proximity sensor body 11 may be formed thin, achieving downsizing.

With this proximity sensor 10, since the largest width of the proximity sensor body 11 at positions lower than the first fixed area 21 down to the detection face 41 is narrower than the width of the opening 24, once the orientation of the chamfers 53 of the fixing member 12 is aligned with the width direction of the proximity sensor body 11, the entire width of the proximity sensor 10 can be decreased, which facilitates inserting the proximity sensor body 11 and the fixing member 12 through the opening 24 into the space 23 including the opening 24 of the groove 14 and the hollow 25 having wider width than the opening 24.

By rotating the fixing member 12 after the proximity sensor body 11 and the fixing member 12 are inserted in the space 23, the inclined guide faces 42 can be positioned to have a width wider than the largest width of the proximity sensor body 11, and since the proximity sensor 10 can be fixed with the inclined guide faces 42 abutting on the circumference of the opening 24 at the end, the proximity sensor 10 can be inserted directly from the opening 24 into the hollow 25, which has a width wider than the opening 24. On the other hand, to remove the deteriorated proximity sensor 10 from the groove 14 for replacement, the fixing member 12 is rotated to align the orientation of the chamfers 53 of the fixing member 12 with the width direction of the proximity sensor body 11, and the proximity sensor 10 can be removed directly from the opening 24 without removing the entire substrate 13, on which the proximity sensor 10 is mounted.

Moreover, if the proximity sensor 10 can be attached in this way by inserting it through the opening 24, there is no need to allow a space for attaching/detaching the proximity sensor 10 around the place where the substrate 13, on which the proximity sensor is mounted, or in the vicinity of the groove 14, which ensures saving of space for installation.

More specifically, in a case where the proximity sensor 99 of the prior art as shown in FIG. 20 is mounted by inserting it from the end portion 94a of the groove 94 and sliding it within the groove 94, to install a device for mounting, to which the proximity sensor 99 is to be mounted, such as an air cylinder, a space where the proximity sensor 99 can be inserted into the end portion 94a of the groove 94 must be allowed, in addition to the installation space of the device for mounting itself, around the device for mounting. Meanwhile, if direct mounting from the opening 24 of the groove 14 is allowed as in the case of the proximity sensor 10 in this embodiment, there is no need to provide such a space around the device to be mounted, and as a result, space saving is allowed.

In addition, it is only necessary to turn the securing portion 40 of the fixing member 12 by half-turn or less from the time when the proximity sensor 10 is inserted into the groove 14 to the time when it is fixed in a given position within the groove 14. The proximity sensor 10 can thus be mounted more easily.

More specifically, to insert the proximity sensor 99 of the prior art shown in FIG. 20 from the end portion 94a of the groove 94, the screw 92 must be turned repeatedly to allow the sensor to be housed within the screw hole 93 mostly completely, and then after the proximity sensor 99 is slid, the screw 92 must be turned several times at a given position. Meanwhile, the proximity sensor 10 in this embodiment needs turning only by half-turn or less, thus minimizing the time and labor of turning.

According to such mounting structure for the proximity sensor 10, since the detection face 41 of the proximity sensor body 11 is formed to have an inclined convex shape and the bottom 26 of the groove 14 is formed to have a concave shape corresponding to the shape of the detection face 41, once the detection face 41 of the proximity sensor body 11 is pressed against the bottom 26 of the hollow 25, the proximity sensor body 11 on the side of the detection face 41 of the proximity sensor body 11 is easily guided into the given position on the bottom 26 to position the detection face 41 of the proximity sensor 11 in the appropriate position at the bottom 26.

According to the proximity sensor 10 as a rotationally connected structure described above, the fixing member 12 has the securing portion 40 and the circular cross-sectional axis portion 27; the axis portion 27 has the straight axis portion 56 formed on the side of the securing portion 40, and the stopper axis portion 57 having a diameter larger than that of the straight axis portion 56 and formed on the side opposite to the securing portion 40 across the straight axis portion 56; and one end of the housing hole 28 provided on the proximity sensor body 11 is made to be smaller than the securing portion 40; and the straight axis portion 56 has a straight support 54 to be mounted in slidable and rotatable state. Consequently, when the axis portion 27 of the fixing member 12 is placed in the housing hole 28 of the proximity sensor body 11, the proximity sensor body 11 can be supported in rotatable state by the axis portion 27, and the securing portion 40 and the stopper axis portion 57 control the movement of the proximity sensor body 11 in the axial direction.

In this way, the time and labor necessary for inserting the fixing member 12 into the housing hole 28 of the proximity sensor body 11 during the mounting work can be minimized, and the fixing member 12 is prevented from being detached from the proximity sensor body 11 without fail. In other words, although the fixing member 12 is in flexibly rotatable state when the proximity sensor 10 is fixed into the groove 14, as a result of being placed in the housing hole 28 of the proximity sensor body 11, the fixing member is not detachable from the proximity sensor body 11. Consequently, even during the period when the proximity sensor 12 is mounted to the substrate 13, the fixing member 12 is supported by the proximity sensor body 11 and thus prevented from being detached, which eliminates the need for mounting other members such as screws to the proximity sensor body 11 for matching. At the same time, since the fixing member 12 is not detached even though it is supported on the proximity sensor body 11, fall and loss of the fixing member 12 can be prevented. Moreover, even if insufficient tightening force of the attached proximity sensor 12 may cause loosening of the proximity sensor 12 due to vibrations of the mount 13, for example, the fixing member 12 is prevented from being detached from the proximity sensor body 11 and falling without fail. There is no need to use other members to prevent loosening. As a result, parts management, transfer, and mounting work are facilitated.

With this proximity sensor 10 as the rotationally-connected structure, since the stopper axis portion 57 is in a tapered shape with its diameter increasing along the direction getting away from the securing portion 40, and the stopper support 55 is in a shape corresponding to the tapered shape of the stopper axis portion 57, they can be slid relative to each other even if the difference between the distance from the securing portion 40 to the stopper support 55 in the axis portion 27 and the distance from the end portion of the housing hole 28 to the stopper support 55 is made small. Such a simple structure achieves relative rotation, minimizing the deviation of the fixing member 12 and the proximity sensor body 11 in the axial direction.

In particular, since the stopper axis portion 57 and the stopper support 55 are in a tapered shape, by forming a small gap, the entire faces of the tapered portions can be separated from each other, thereby minimizing sliding resistance. More specifically, if the stopper axis portion 57 and the stopper support 55 are formed in a shape having circular cross-sectional shape that is uniform in the longitudinal direction, unless both are removed from the housing hole 28 completely, the stopper axis portion 57 and the stopper support 55 contact each other. It is therefore difficult to suppress sliding resistance. Meanwhile, if tapered shape is adopted, the entire portions can be separated from each other by forming a small gap, which makes it possible to minimize sliding resistance.

According to the method of manufacturing the proximity sensor 10 as a rotationally-connected structure, the fixing member 12 having the securing portion 40, the straight axis portion 56, and the stopper axis portion 57 is manufactured in the first member manufacturing process; resin 64 is formed in a state where the securing portion 40 of the fixing member 12 is detached from the cavity 62 of the mold 60 and the stopper axis portion 57 is placed within the cavity 62 in the second member manufacturing process; and then the securing portion 40 of the fixing member 12 is pressurized to release the connection between the fixing member 12 and the proximity sensor body 11, to ensure relative rotation. It is therefore possible to manufacture a proximity sensor 10 that allows the fixing member 12 and the proximity sensor body 11 to rotate relative to each other without performing the work for connecting both in rotatable state. The manufacturing processes and the work can thus be minimized to facilitate the manufacture.

According to the method of manufacturing the proximity sensor 10 as the rotationally-connected structure, the mold 60 has a solid-shaped portion 63 for forming the hollow 25, which has a cross-sectional shape corresponding to the maximum cross section of the axis portion 27, extending from a position adjacent to the fixing member 12 placed on one side of the cavity to the other side of the cavity 62. Consequently, the gap 30 can be formed at the position axially adjacent to the fixing member 12 in the molded body 65 obtained in the manufacturing process of the proximity sensor body 11. Thus, when the connection is released by applying pressure on the securing portion 40 of the fixing member 12, the axis portion 27 of the fixing member 12 is allowed to move into the gap 30 in the molded body 65 easily to facilitate releasing the connection.

According to this method, since the stopper axis portion 57 is formed into a tapered shape having a diameter increasing in a direction getting away from the securing portion 40, only by moving the fixing member 12 relative to the proximity sensor 11, the connection between the fixing member 12 and the proximity sensor body 11 can be released to the extent that they can be rotated relative to each other. The work of releasing the connection can thus be facilitated.

The first embodiment described above can be altered appropriately within the scope of the present invention. For example, in the above embodiment, the case where the fixing member 12 as shown in FIG. 5 is used to manufacture the proximity sensor 10 has been described. However, the method of manufacturing the proximity sensor 10 of the present invention may be similarly applied to a fixing member having a head rather than the securing portion 40.

The case where the width of the resin sealing portion 34 on the side of the detection face of the fixing member 12 is smaller than the width of the opening 24 of the groove 14 has been described above. The present invention may be applied even if this width is wider than the width of the opening 24, provided that it is formed narrower than the width of the groove 14. In this case, to attach the proximity sensor 10, the proximity sensor body 11 may be slid from the end side of the groove 14.

The case where the bottom 26 of the hollow is in a curved shape has been described above. However, the bottom may be an inclined surface descending toward the center, or the present invention may be applicable to a flat bottom 26. The case where the inclined guide faces 42 having the circumferential inclination θ1 and the radial inclination θ2 has been described above. However, the radial inclination θ2 may not always be formed on the inclined guide faces 42.

Second Embodiment

Figure 8:
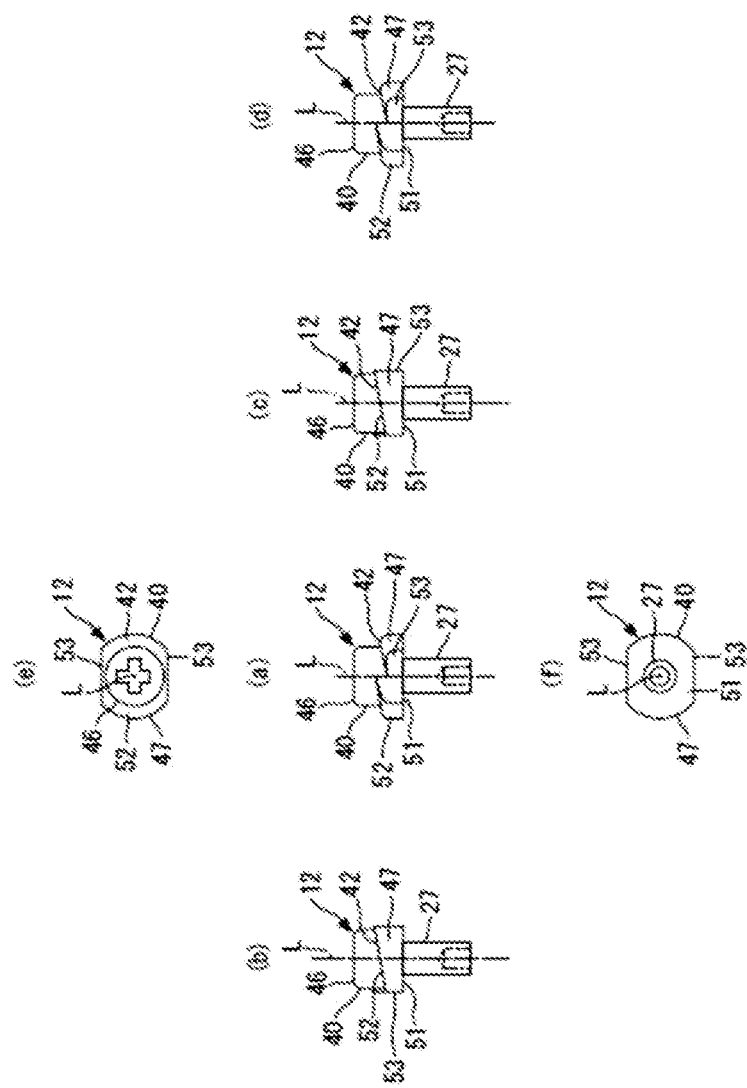
FIG. 8 (a) is a front view, FIG. 8 (b) is a left side view, FIG. 8 (c) is a right side view, FIG. 8 (d) is a rear view, FIG. 8 (e) is a plan view, and FIG. 8 (f) is a bottom view of the fixing member according to a second embodiment.
Figure 9:
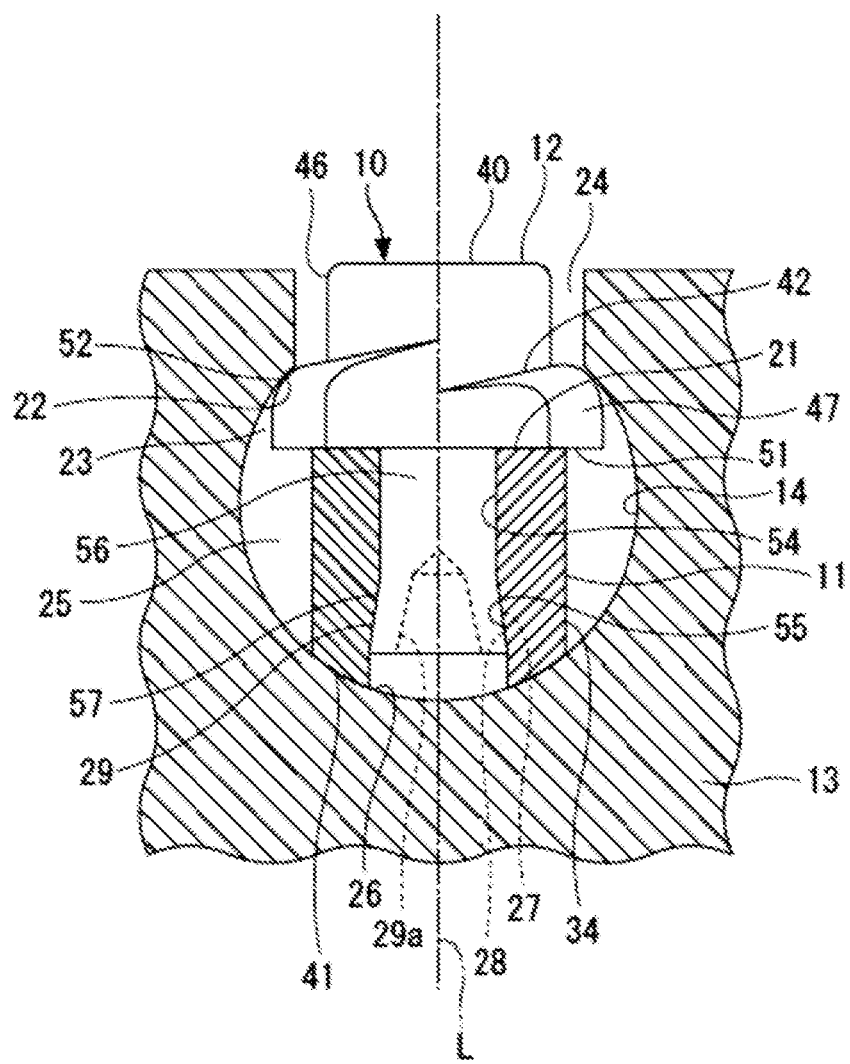
FIG. 9 is a sectional view showing the mounting structure of the proximity sensor according to the second embodiment after attachment.

FIG. 8 and FIG. 9 show a second embodiment.

In the second embodiment, as shown in FIG. 8, a caulking portion 29 made of materials susceptible to plastic deformation such as aluminum and metals such as iron is formed at the end of the axis portion 27 of the fixing member 12. The caulking portion 29 has a wall surface 29b created by forming a central hole 29a extending from the end of the axis portion 27 in the axial direction. This fixing member 12 is intended to be used in a state supported in the housing hole 28 of the proximity sensor 11 in rotatable state.

The proximity sensor body 11 is manufactured into a shape of the first embodiment as shown in FIG. 3 and FIG. 4, in a state where the fixing member 12 does not exist. The housing hole 28 of the proximity sensor body 11 has the straight support 54 having a uniform cross-sectional shape and the stopper support 55 formed into a tapered shape with the side of the detection face 41 being wider.

To allow the proximity switch body 11 to support the fixing member 12 in rotatable state, as shown in FIG. 8 (a), the axis portion 27 of the fixing member 12 is inserted into the housing hole 28 of the proximity switch body 11, the first abutting portion 51 of the securing portion 40 is made to abut on the first fixed area 21, in this state a caulking tool is inserted from the end of the housing hole 28 on the side of the detection face 41, and the caulking portion 29 is pressed in the axial direction to deform the outer peripheral shape of the caulking portion 29 of the axial portion 27 into a tapered shape as shown by the imaginary line, to form the stopper axis portion 57.

In this case, the remaining portion of the axis portion 27 becomes the straight axis portion 56, and this straight axis portion 56 and the stopper axis portion 57 are placed corresponding to the straight support 54 and the stopper support 55 of the housing hole 28. Consequently, the axis portion 27 is supported in the housing hole 28 in flexibly rotatable state. It should be noted that in the securing portion 40, the inclined guide faces 42 are formed on the entire circumference of the central portion 46 of the securing portion 40, and accordingly the chamfers 53 are made to be slightly smaller.

The fixing member 12 according to the second embodiment, the proximity sensor 10 using this fixing member 12, and the mounting structure using this proximity sensor 10 can also achieve the same function effect as the first embodiment.

In the second embodiment, since the caulking portion 29 is formed in the axis portion 27 of the fixing member 12, by deforming the caulking portion 29 when manufacturing the proximity sensor 10 as a rotationally-connected structure, the fixing member 12 and the proximity sensor body 11 can be connected in rotatable state. Although the manufacturing method in the second embodiment is different from that of the first embodiment, where the proximity switch body 11 is formed with the fixing member 12 placed therein, the proximity sensor 10 as a rotationally-connected structure can be manufactured easily.

Third Embodiment

Figure 10:
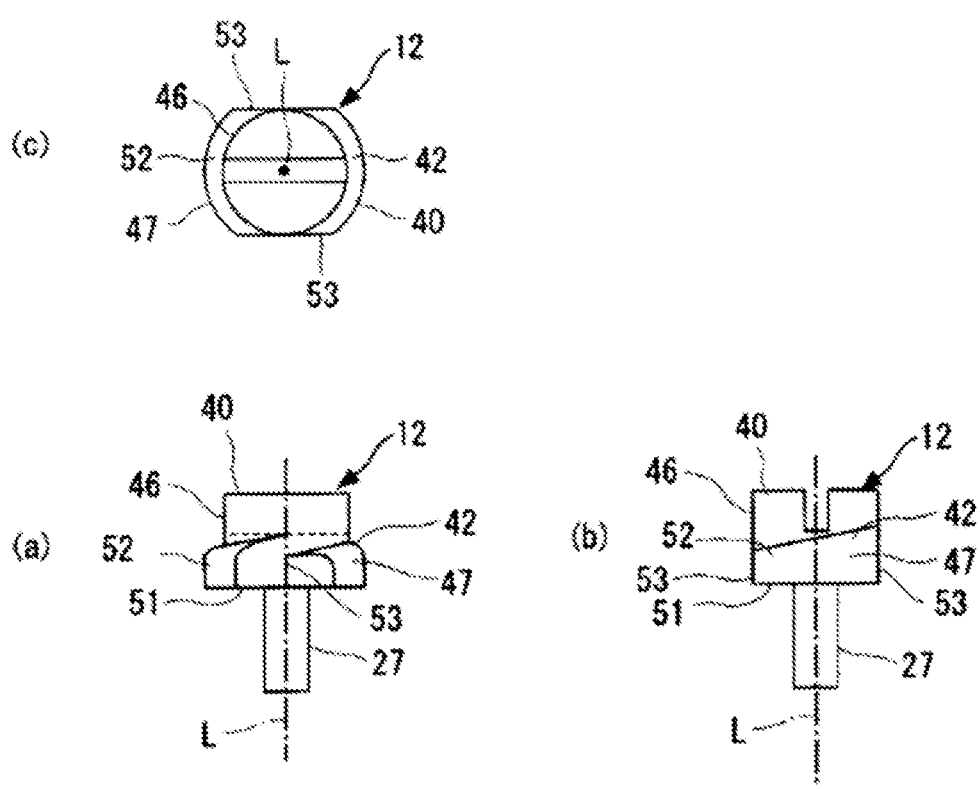
FIG. 10 (a) is a front view, FIG. 10 (b) is a right side view, and FIG. 10 (c) is a plan view of the fixing member according to a third embodiment.
Figure 11:
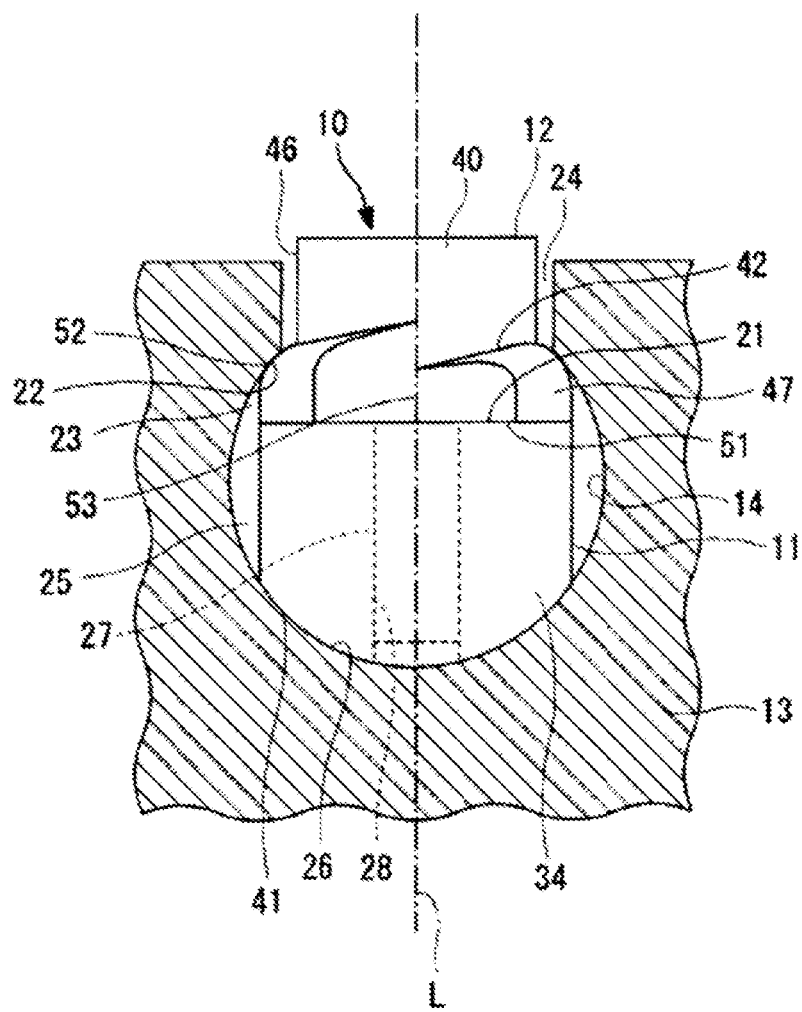
FIG. 11 is a sectional view showing the mounting structure of the proximity sensor according to the third embodiment after attachment.

FIG. 10 and FIG. 11 show a third embodiment.

In the third embodiment, both the axis portion 27 of the fixing member 12 and the housing hole 28 of the proximity sensor 10 are formed so that their respective cross section along the rotational axis L is in a uniform circular shape. In addition, the width of the resin sealing portion 34 of the proximity sensor body 11 is larger than that of the opening 24 of the groove 14. The other aspects are the same as those of the mounting structure according to the first embodiment.

With this mounting structure, the proximity sensor body 11 cannot be passed through the opening 24 of the groove 14 to attach the proximity sensor 10. Therefore, just like the structure shown in FIG. 20, the proximity sensor body 11 is inserted from the end of the groove 14 formed on the side of the mount 13 and slid through the grove 14 to place it in a desired position.

The fixing member 12 is detachable from and attachable to the proximity sensor body 11. Consequently, the proximity sensor body 11 is positioned at a given detection position, the axis portion 27 is inserted into the housing hole 28 of the proximity sensor body 11 through the opening 24 on the front side of the groove 14 for mounting, and then as in the case of the first embodiment, the axis portion 27 is fixed within the groove 14 using the securing portion 40. Thus, the proximity sensor 10 can be inserted into the groove 14.

With the mounting structure described above, since inclined guide faces 42, which incline both circumferentially and radially, are provided around the rotational axis L in the plurality of second abutting portions 52 of the securing portion 40, by placing the securing portion 40 between the first fixed area 21 and the second fixed area 22 and rotating the same, the distance between the first abutting portion 51 to each position of the inclined guide faces 42 increases or decreases along the circumferential direction of the inclined guide faces 42.

Thus, by rotating the securing portion 40, the first abutting portion 51 of the securing portion 40 can be made to abut on the first fixed area, and the inclined guide faces 42 can be made to abut on the second fixed area 22, thereby allowing the securing portion 40 to be fixed between the first fixed area and the second fixed area.

Moreover, since the inclined guide faces 42 face opposite to the opening 24 and the circumference of the opening 24, and incline in the radial direction, once the inclined guide faces 42 are pressed against the second fixed area 22 around the circumference of the opening 24, the securing portion can shift to an appropriate position at the center, and thus the securing portion is prevented from being fixed eccentrically with respect to the opening 24. Thus, the fixing member 12 having the securing portion 40 can be easily fixed at the center of the opening 24.

With this fixing member 12, since the plurality of inclined guide faces 42 are formed at regular intervals in the circumferential direction and asymmetrically with respect to the rotational axis L, the distance from the first abutting portion 51 to the inclined guide faces 42 can be made uniform, and the inclination of the plurality of inclined guide faces 42 at each position in the radial direction from the rotational axis L can also be made uniform. Accordingly, by allowing the inclined guide faces 42 of the securing portion 40 to abut on the round-shaped opening 24, thus pressing down the securing portion 40, more accurate centering can be made.

Since this fixing member 12 includes the axis portion 27 protruding from the securing portion 40 along the rotational axis L and having a circular cross-sectional shape, the fixing member 12 can be fixed to the proximity sensor body 11 in flexibly rotatable state using the axis portion 27. Moreover, if the housing hole 28 is formed in the proximity sensor body 11, the axis portion 27 can be housed in this housing hole 28, the securing portion 40 can be rotated in a state supported by the housing hole 28, and the fixing member 12 can be placed at a given position before fixing to improve workability significantly.

In this case, by forming the housing hole 28 for housing the axis portion 27 in rotatable state in the proximity sensor body 11, housing various members together with the fixing member 12 within the opening 24 and the space 23 having wider width than the opening 24, and rotating the securing portion in this state, the various kinds of members can be pressed against the bottom and fixed by the securing portion.

Since there is no need to form a thread groove on the inner wall of the housing hole 28 of the proximity sensor body 11, the housing hole 28 can be formed small. In addition, since the proximity sensor body 11 is fastened not by screwing but by pressing the same from one side to the other, the strength of the circumference of the housing hole 28 can be reduced. As a result, the width of the proximity sensor body 22 can be decreased, and downsizing is thus allowed.

Since the chamfers 53 are formed in this securing portion 40 in order that the distance between opposed positions on a plane orthogonal to the rotational axis L is smaller than the width of the opening 24, the securing portion can be inserted from between the marginal parts of the opening 24 with the orientation of the chamfers 53 aligned. Furthermore, by rotating the securing portion 40, the inclined guide faces 42 can be made to abut on the same opening 24 from inside, the securing portion 40 can be inserted into the opening 24 having narrower width than the width of the inclined guide faces 42 from the front side, and thus fixing operation using the fixing member 12 is facilitated.

Fourth Embodiment

Figure 12:
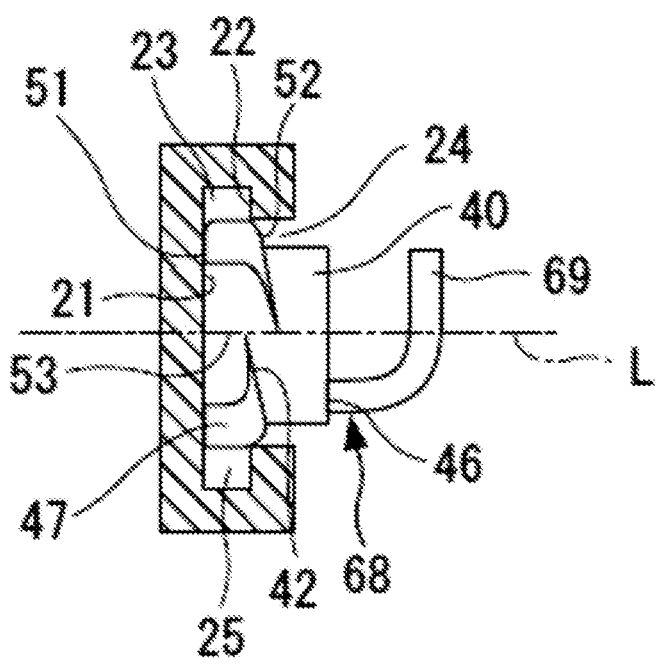
FIG. 12 is a side view of the mounting structure of rail and hook members according to a fourth embodiment.
Figure 13:
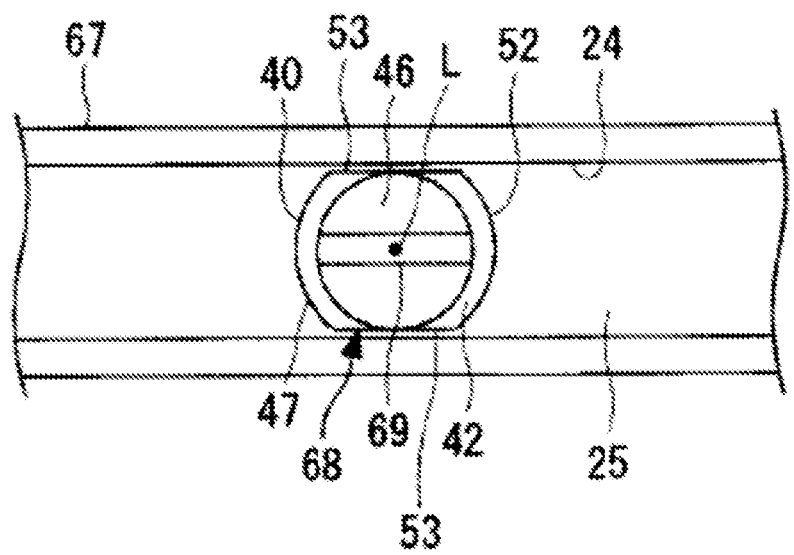
FIG. 13 is a plan view showing the mounting structure for the rail and hook members according to the fourth embodiment.

FIG. 12 and FIG. 13 show a fourth embodiment.

The fourth embodiment is a structure for mounting a hook member 68 as a fixing member to a rail 67 to be fixed to various portions of ceilings, walls, furniture, etc. The structure is intended to be used with various members hung on the hook 69 of this hook member 68.

The rail 67 is made of resin, metals, etc., is formed long, and has approximately C-shaped cross-sectional shape. An opening 24 is formed on the front side, and the rail can be fixed using fixing means such as screws, adhesive agents, and two-sided adhesive tapes at various positions on the rear side.

The rail 67 has a first fixed area 21 and an opening 24 at a position facing opposite to and spaced apart from the first fixed area 21. A second fixed area 22 is formed in a state where displacement relative to the first fixed area is not allowed. Furthermore, the circumference at the inner end of the opening 24 is a surface extending in a direction orthogonal to the rotational axis L of the hook member 68.

In the first embodiment, the first fixed area and the second fixed area were formed by different members, but in the fourth embodiment, the first fixed area and the second fixed area are made of the same member, the rail 67.

The hook member 68 is made of a resin, metal, etc., for example, and includes a securing portion 40 and a hook 69 formed protruding from the securing portion 40.

The securing portion 40 is in a shape rotatable relative to the first and the second fixed areas 21, 22 around the rotational axis L that extends in a direction penetrating the opening 24, and has a wide width portion 47 formed in a stepped shape protruding from the central portion 46 and the side periphery of the central portion 46 toward the sides.

The rear face of this securing portion 40 become a first abutting portion 51, and the surface of the wide width portion 47 on the opening 24 side becomes the second abutting portions 52. In the second abutting portions 52, inclined guide faces 42, which incline in the circumferential direction with one side of the rotational direction coming closer to the opening and also in the radial direction with the side closer to the rotational axis coming closer to the opening 24, are formed around the rotational axis L by half-turn or less.

The inclined guide faces 42 are formed at regular intervals in the circumferential direction and asymmetrically with respect to the rotational axis. It is necessary that the positions of the inclined guide faces 42 farthest to the opening 24 do not contact the circumference of the opening 24 at the end when the first abutting portion 51 is made to abut on the first fixed area 21. It is also necessary that the first fixed area of the inclined guide faces 42 closest to the opening 24 is higher than the position where abutting on the periphery of the opening 24 is allowed, when the first abutting portion 51 is made to abut on the first fixed area 21.

The circumferential inclination of each of the inclined guide faces 42 can be selected as required, but it is preferable that an inclination allowing the rotational distance of the securing portion 40 to be approximately 90° is selected because the hook 69 can be placed vertically. The radial inclination of each of the inclined guide faces 42 may be the same as that of the inclined guide faces 42 in the first embodiment.

With the securing portion 40 in this embodiment, the chamfers 53 are formed at a pair of opposed positions on a plane orthogonal to the rotational axis L and between the two inclined guide faces 42, in order that the distance between the opposed positions on a plane orthogonal to the rotational axis L is smaller than the width of the opening 24, namely, a pair of chamfers 53 are formed in parallel to each other. The hook 69 is placed in parallel to these chamfers 53.

With such mounting structure, by inserting the securing portion 40 of the hook member 68 into the rail 67 through the opening 24, with the orientation of the hook 69 and the securing portion 40 aligned with the opening 24 of the rail 67, and rotating the securing portion 40 by approximately 90° in a state where the first abutting portion 51 is abutting on the bottom of the rail 67, the inclined guide faces 42 are pressed against the lateral edge of the inner end of the opening 24 to fix the hook member 68 to the rail 67. In this state, the mounting structure can be used with various members hooked on the hook 69. This mounting structure can also achieve the same function effect as the third embodiment.

Fifth Embodiment

Figure 14:
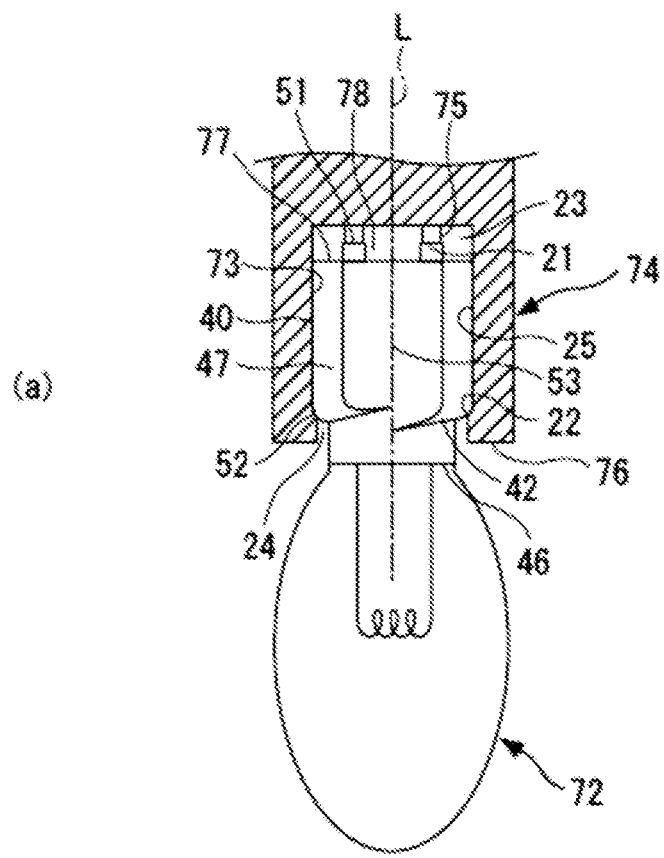
FIG. 14 (a) is a sectional view showing the mounting structure for an electric bulb and a socket according to a fifth embodiment and FIG. 14 (b) is a bottom view of the socket.
Figure 14:
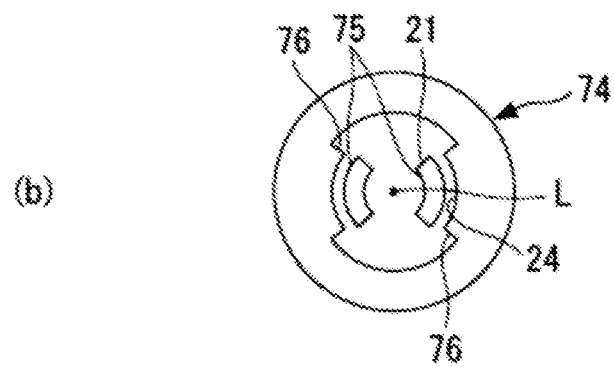

FIG. 14 (a) and FIG. 14 (b) show a fifth embodiment.

The fifth embodiment is a mounting structure wherein an electric bulb 72 as a fixing member is inserted into a socket 74 having a connection port 73.

The socket 74 has socket electrodes 75 that serve as a first fixed area 21 at the bottom of a connection hole 73. At positions facing opposite to and being spaced apart from the first fixed area 21, a pair of projections 76 protruding toward the center of the connecting hole 73 are formed, and an opening 24 is formed between these protrusions 76. On the circumference of the inner end of the opening 24, a second fixed area 22 that cannot be displaced relative to the first fixed area 21 is formed.

The electric bulb 72 has a connection 77 formed on one side, and electric bulb electrodes 78 connectable to the socket electrodes 75 are provided at the end of the connection 77. A securing portion 40 similar to that of the third embodiment is formed on the side periphery of the connection 77 housed in the socket 74, and inclined guide faces 42 are formed on a pair of wide width portions 47.

With this mounting structure for the bulb 72, the connection 77 of the electric bulb 72 is inserted into the connecting hole 73 in an orientation allowing the wide width portions 47 to correspond to a position different from the pair of protrusions 76 of the socket 74, and the rotational axis L is rotated by approximately 90° with the end of the connection 77 made to abut on the bottom of the connecting hole 73. This allows the inclined guide faces 42 to be pressed against the lateral edge of the inner end of the opening 24 to fix the electric bulb 72 into the socket 74. At the same time, the electric bulb electrodes 78 are connected to the socket electrodes 75. In this state, the electric bulb 72 can be turned on. This mounting structure also achieves the same function effect as the third embodiment.

Sixth Embodiment

Figure 15:
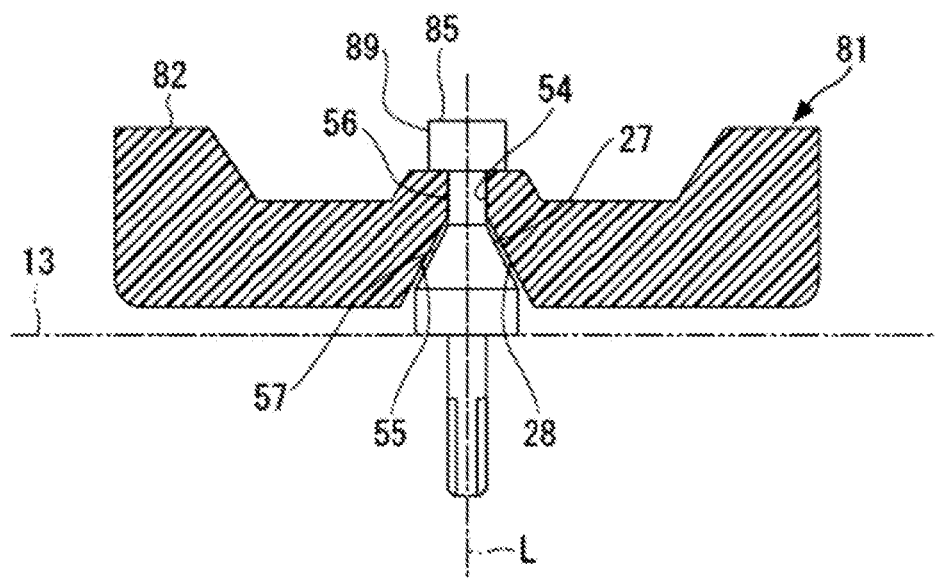
FIG. 15 is a sectional view of a caster according to a sixth embodiment.

FIG. 15 shows a sixth embodiment.

The sixth embodiment is an example of a caster 81 as a rotationally-connected structure, wherein a caster body 82 is attached to a mount 13 shown by an imaginary line by a caster axis 83.

The caster 81 is formed by connecting the caster body 82 as a second member and the caster axis 83 for supporting the caster body 82 as a first member in flexibly rotatable but undetachable state.

The caster axis 83 has a head 85 and an axis portion 27 having circular cross section, and the axis portion 27 has a straight axis portion 56 and a stopper axis portion 57 having a diameter larger than that of the straight axis portion 56 and formed on the opposite side of the head 85.

The caster body 82 has a circular outer peripheral shape, houses the axis portion 27 in rotatable state at the center, and has a housing hole 28 having the end on the side of the head 85 smaller than the head 85. The housing hole 28 has a straight support 54 for supporting the axis portion 56 in slidable and rotatable state and a stopper support 55 for supporting the stopper axis portion 57 in slidable state, and the stopper support 55 has a shape corresponding to the tapered shape of the stopper axis portion 57.

Such a caster 81 can also be manufactured in the same manner as the proximity sensor 10 in the first embodiment. More specifically, insert molding is performed by using the caster axis 83 instead of the fixing member 12 in the first embodiment and a mold 60 having a cavity 62 corresponding to the caster body 82, placing the caster axis 83 at the center of the caster body 82 with the head 85 maintained apart from the cavity 62, performing clamping, and then injecting thermoplastic resin. After mold release, pressure is applied to the head 85 in the axial direction to release the connection between the caster axis 83 and the caster body 82. The caster 81 can thus be manufactured.

With the caster 81 as a rotationally-connectable structure described above, since the caster axis 83 has the head 85 and the axis portion 27 having a circular cross section; the axis portion 27 has the straight axis portion 56 formed on the side of the head 85 and the stopper axis portion 57 having a the diameter larger than that of the straight axis portion 56 and formed on the opposite side of the head 85; one end of the housing hole 28 formed in the caster body 82 is smaller than the head 82; and the straight axis portion 56 has the straight support 54 for supporting the straight axis portion 56 in slidable and rotatable state, once the axis portion 27 of the caster axis 83 is placed in the housing hole 28, the caster body 82 can be supported by the axis portion 27 in rotatable state, and at the same time, the head 85 and the stopper axis portion 57 control the movement of the caster body 82 toward both sides in the axial direction.

Thus, time and labor for inserting the caster axis 83 in the housing hole 28 of the caster body 82 during mounting work is eliminated, and the caster axis 83 can be prevented from detaching from the caster body 82 without fail.

With this caster 81 as a rotationally-connected structure, since the stopper axis portion 57 has a tapered shape with its diameter increasing in the direction getting away from the head 85, and the stopper support 55 is in a shape corresponding to the tapered shape of the stopper axis portion 57, mutual sliding is allowed even if the difference between the distance from the head 85 to the stopper support 55 in the axis portion 27 and the distance from the end of the housing hole 28 to the stopper support 55 is maintained small. Mutual rotation between the caster axis 83 and the caster body 82 can thus be ensured, with displacement in the axial direction maintained minimal, by a simple structure.

In particular, since the stopper axis portion 57 and the stopper support 55 are in a tapered shape, by forming a small gap, the entire faces of the tapered portions can be separated from each other, thereby minimizing sliding resistance. More specifically, if the stopper axis portion 57 and the stopper support 57 are formed in a shape having circular cross-sectional shape that is uniform in the longitudinal direction, unless both are removed from the housing hole 28 completely, the stopper axis portion 57 and the stopper support 55 are made to contact each other. It is therefore difficult to suppress sliding resistance. Meanwhile, if tapered shape is adopted, the entire portions can be separated from each other by forming a small gap, which makes it possible to minimize sliding resistance.

According to the method of manufacturing the caster 81 as a rotationally-connected structure, the caster axis 83 having the head 85, the straight axis portion 56, and the stopper axis portion 57 is manufactured in the first member manufacturing process; resin 64 is formed in a state where the head 85 of the caster axis 83 is detached from the cavity 62 of the mold 60 and the stopper axis portion 57 is placed within the cavity 62; and then the head 85 of the caster axis 83 is pressurized to release the connection between the caster axis 83 and the caster body 82, to ensure relative rotation. It is therefore possible to manufacture the caster 81 that allows the caster axis 83 and the caster body 82 to rotate relative to each other without performing the work for connecting both in rotatable state. The processes of manufacturing the caster 81 and the manufacturing work can thus be minimized to facilitate the manufacture.

According to this method, since the stopper axis portion 57 is formed into a tapered shape having a diameter increasing in a direction getting away from the head 85, only by moving the caster axis 83 slightly relative to the caster body 82, the connection between the caster axis 83 and the caster body 82 can be released to the extent that they can be rotated relative to each other.

Figure 16:
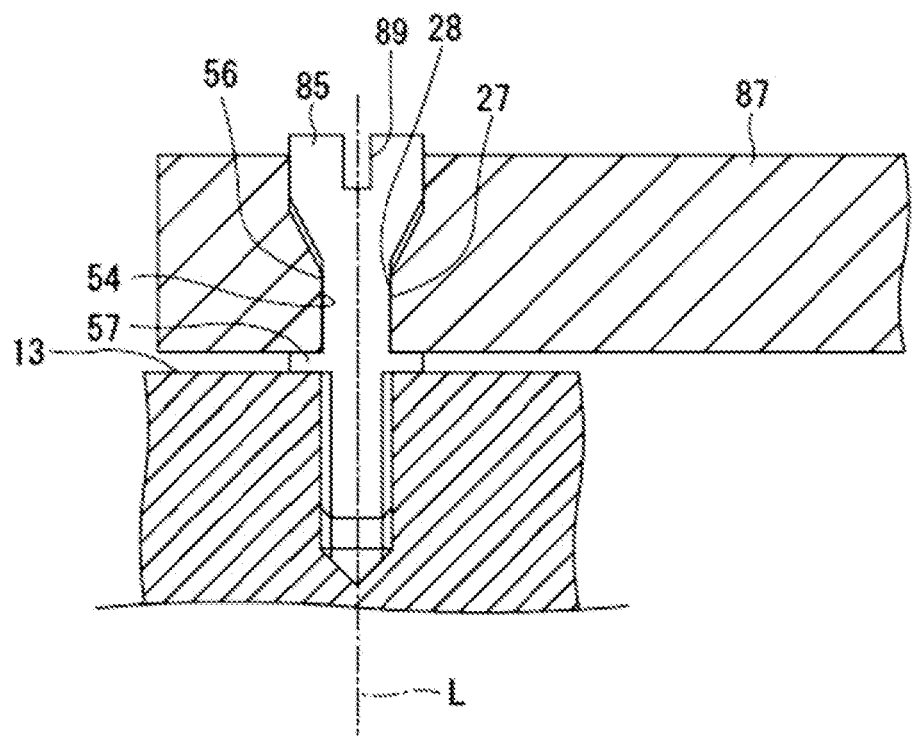
FIG. 16 is a sectional view showing a variation of the caster according to the sixth embodiment.

In the above embodiment, the flexibly rotatable caster was described as the second member. However, other rotatable members may be used. For example, a member rotatable by less than one turn such as a lever 87 shown in FIG. 16 to be fixed to a mount 13 in flexibly rotatable state, may be used as the second member. In this example, the stopper axis portion 57 is formed in a shape of a disk or a ring orthogonal to the rotational axis L and no stopper support 55 is formed within the housing hole 28.

Seventh Embodiment

Figure 17:
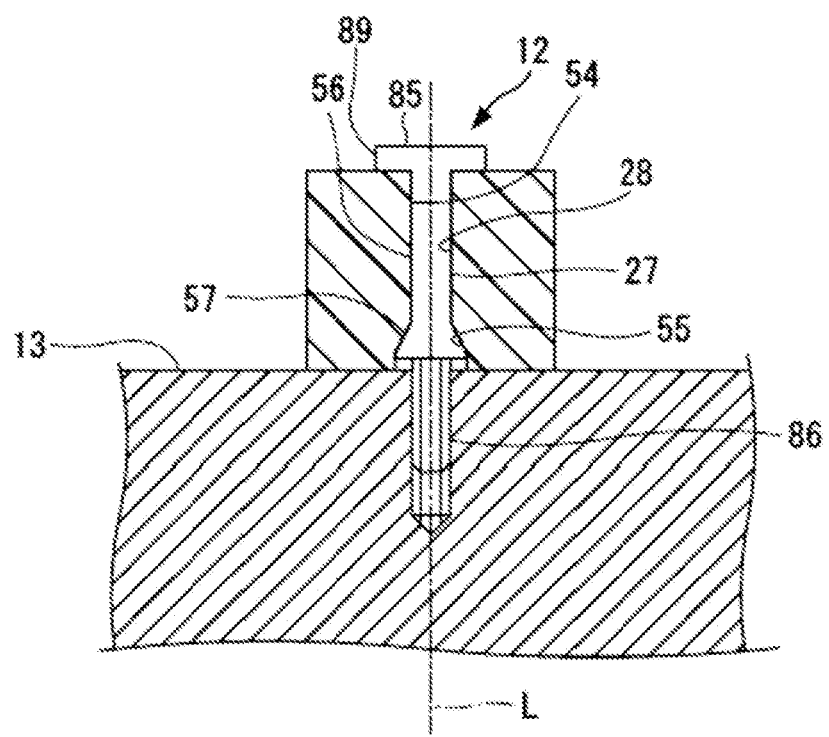
FIG. 17 is a sectional view showing the mounting structure for a fixing member according to a seventh embodiment.

FIG. 17 shows a seventh embodiment.

The seventh embodiment is an example of a mounting structure wherein a member to be fixed 88 to a mount 13 is fixed using a fixing member with a screw. In this embodiment, the member to be fixed 88 as a second member and the fixing member 12 with the screw as a first member are connected in relatively rotatable but not detachable state.

The fixing member 12 with the screw has a head 85 and a circular cross-sectional axis portion 27, and the axis portion 27 has a straight axis portion 56 formed on the side of the head 85 and a stopper axis portion 57 having a diameter larger than the straight axis portion 56 and formed on the side opposite to the head 85 across the straight axis portion 56.

In this embodiment, the stopper axis portion 57 is in a tapered form with its diameter increasing along the direction getting away from the head 85, and a male screw 86 protruding from the stopper axis portion 57 along the rotational axis L is provided. On the other hand, on the head 85, a driver clamping portion 89 for turning the male screw 86 is formed.

Meanwhile, the member to be fixed 88 is made of a resin, is formed into a shape appropriate for abutting on the mount 13, and has a housing hole 28 for housing the axis portion 27 at a given position with the end on the side of the head being smaller than the head 85. The housing hole 28 has a straight support 54 for supporting the straight axis portion 56 in slidable and rotatable state, and a stopper support 55 that allows the stopper axis portion 57 to be slidable, and the stopper support 55 is in a shape corresponding to the tapered shape of the stopper axis portion 57. In this embodiment, the sum total of the length of the straight axis portion 56 and that of the stopper axis portion 57 is made to be shorter than the length of the housing hole 28.

Such a rotationally-connected structure having the member to be fixed 88 and the fixing member 12 with a screw can also be manufactured in the same manner as that of the sixth embodiment. This rotationally-connected structure can also achieve the same function effect as the sixth embodiment.

Eighth Embodiment

Figure 18:
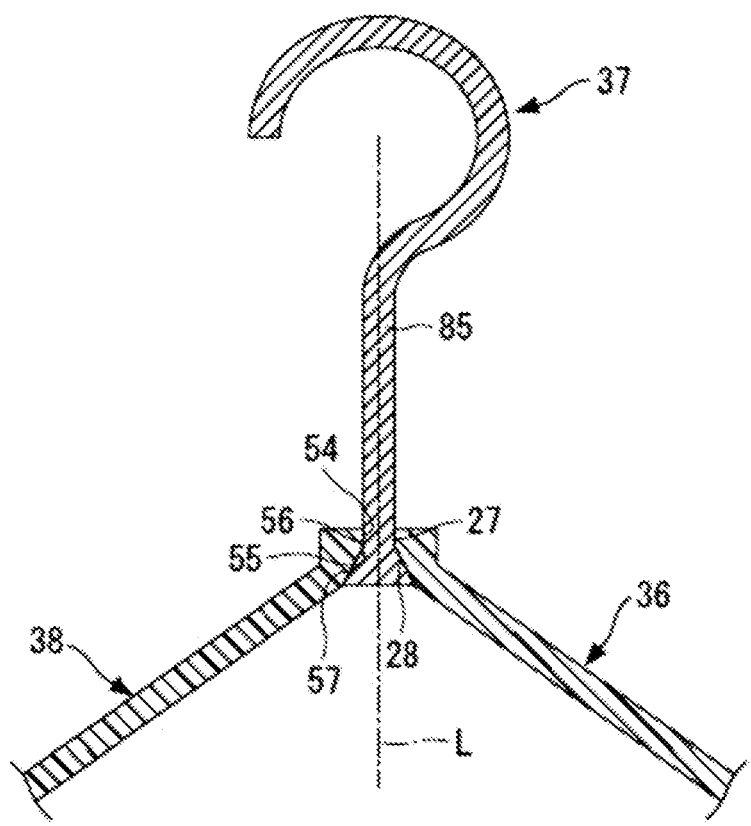
FIG. 18 is a sectional view of the hanger according to an eighth embodiment.
Figure 19:
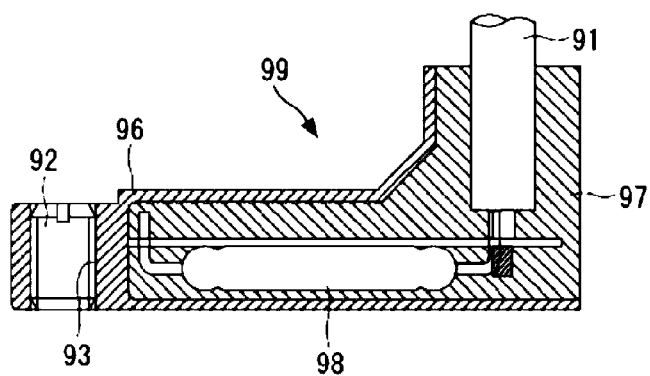
FIG. 19 is a sectional view of the proximity sensor according to prior art.

FIG. 18 shows an eighth embodiment.

The eighth embodiment is an example of a hanger 38 as a rotationally-connected structure, wherein a hook portion 37 as a first member is connected to a hanger body 36 as a second member in rotatable but not detachable state.

The hook portion 37 has a long and circular cross-sectional head 85 that includes a curved portion and an axis portion 27 formed integrally with the head 85 without division, and the axis portion 27 includes a straight axis portion 56 formed on the side of the head 85 and having the same cross-sectional shape as the head 85, and a stopper axis portion 57 formed on the side opposite to the head 85 across the straight axis portion 56 and having a diameter larger than the straight axis portion 56. In this embodiment, the stopper axis portion 57 is formed into a tapered shape with its diameter increasing along the direction getting away from the head 85.

Meanwhile, the hunger body 36 is made of a resin, and has a housing hole 28 with its end on the side of the head 85 being smaller than the head 85 for rotationally housing the axis portion 27 in the boss 39 at the center. The housing hole 28 has a straight support 54 for supporting the straight axis portion 56 in slidable and rotatable state, and a stopper support 55 that allows the stopper axis portion 57 to be slidable, and the stopper support 55 is in a shape corresponding to the tapered shape of the stopper axis portion 57.

This hanger 38 can be manufactured in the same manner as the sixth embodiment. This hanger 38 can also achieve the same function effect as the sixth embodiment.

What is claimed is:

1. A proximity sensor, comprising:
a fixing member; and
a proximity sensor body;
wherein the proximity sensor is mounted on a mount,
the mount having an elongated cylindrical hollow having a longitudinally-extending opening that is narrower than a diameter of the hollow and which is transversely connected with the hollow,
wherein the proximity sensor body is housed in the hollow and fixed with the fixing member,
the proximity sensor body comprising an elongated body having a first fixed area formed on an upper side facing the opening, a detection face provided on an opposing lower side facing a bottom surface of the hollow, and a housing hole extending between the detection face and the first fixed area, wherein a cross-sectional width of the proximity sensor body between the first fixed area and the detection face is narrower than the opening to enable the proximity sensor body to be transversely inserted into the hollow through the opening,
the fixing member having:
a securing portion provided between the first fixed area and a second fixed area disposed on an interior surface of the hollow adjacent the opening, the second fixed area facing opposite to and being spaced apart from the first fixed area;

an axis portion that protrudes from the securing portion along a rotational axis that penetrates the opening, wherein the axis portion is housed in the hole of the proximity sensor body in a rotatable state, wherein the securing portion is formed in a shape rotatable around the rotational axis, the securing portion having a wide width portion where a distance between opposed positions on the wide width portion in a plane orthogonal to the rotational axis is wider than the opening, and a narrow width portion where a distance between opposed positions on the narrow width portion in a plane orthogonal to the rotational axis is narrower than the opening to enable the securing portion to be transversely inserted into the hollow through the opening; and having a first abutting portion abutting on the first fixed area and a plurality of second abutting portions formed on the wide width portion and abutting on an adjacency of the opening of the second fixed area, each of the plurality of second abutting portions having an inclined guide face that inclines in a circumferential direction with one rotational directional coming closer to the opening and that inclines in a radial direction with a position closer to the rotational axis coming closer to the opening, and wherein each of the inclined guide faces is made to abut on the second fixed area, with the first abutting portion abutting on the first fixed area.

2. The proximity sensor as set forth in claim 1, wherein the proximity sensor body is mounted with the detection face abutting on the bottom surface of the hollow.

3. The proximity sensor as set forth in claim 2, wherein the detection face is formed in an inclined convex shape and the bottom surface of the hollow is formed in a concave shape corresponding to the detection face.

4. The proximity sensor as set forth in claim 2, wherein an elastic member is inserted between the first fixed area and the first abutting portion or between the detection face and the bottom surface.

5. The proximity sensor as set forth in claim 1, wherein, the axis portion has a straight axis portion formed on a side of the securing portion, and a stopper axis portion formed on a side opposite to the securing portion and having a diameter larger than that of the straight axis portion, and the housing hole has a straight support wherein the straight axis portion is placed in slidable and rotatable state, and a stopper support wherein the stopper axis portion remains slidable.

6. The proximity sensor as set forth in claim 5, wherein the stopper axis portion is formed in a tapered shape with its diameter increasing in a direction getting away from the securing portion, and the stopper support is formed in a shape corresponding to the tapered shape of the stopper axis portion.

7. A proximity sensor mounting structure, comprising:
a proximity sensor and a mount;
wherein the proximity sensor is mounted on the mount,
the proximity sensor comprising:
a fixing member; and
a proximity sensor body;
the mount having an elongated cylindrical hollow having a longitudinally-extending opening that is narrower than a diameter of the hollow and which is transversely connected with the hollow,
wherein the proximity sensor body is housed in the hollow and fixed with the fixing member,
the proximity sensor body comprising an elongated body having a first fixed area formed on an upper side facing the opening, a detection face provided on an opposing lower side facing a bottom surface of the hollow, and a housing hole extending between the detection face and the first fixed area, wherein a cross-sectional width of the proximity sensor body between the first fixed area and the detection face is narrower than the opening to enable the proximity sensor body to be transversely inserted into the hollow through the opening, the fixing member having:

a securing portion provided between the first fixed area and a second fixed area disposed on an interior surface of the hollow adjacent the opening, the second fixed area facing opposite to and being spaced apart from the first fixed area;

an axis portion that protrudes from the securing portion along a rotational axis that penetrates the opening, wherein the axis portion is housed in the hole of the proximity sensor body in a rotatable state, wherein the securing portion is formed in a shape rotatable around the rotational axis, the securing portion having a wide width portion where a distance between opposed positions on the wide width portion in a plane orthogonal to the rotational axis is wider than the opening, and a narrow width portion where a distance between opposed positions on the narrow width portion in a plane orthogonal to the rotational axis is narrower than the opening to enable the securing portion to be transversely inserted into the hollow through the opening; and having a first abutting portion abutting on the first fixed area and a plurality of second abutting portions formed on the wide width portion and abutting on an adjacency of the opening of the second fixed area, each of the plurality of second abutting portions having an inclined guide face that inclines in a circumferential direction with one rotational directional coming closer to the opening, wherein each of the inclined guide faces is made to abut on the second fixed area, with the first abutting portion abutting on the first fixed area, wherein the proximity sensor body is mounted with the detection face abutting on the bottom of the hollow, and wherein an elastic member is inserted between the first fixed area and the first abutting portion or between the detection face and the bottom.

8. The proximity sensor mounting structure as set forth in claim 7, wherein, the axis portion has a straight axis portion formed on a side of the securing portion, and a stopper axis portion formed on a side opposite to the securing portion and having a diameter larger than that of the straight axis portion, and the housing hole has a straight support wherein the straight axis portion is placed in slidable and rotatable state, and a stopper support wherein the stopper axis portion remains slidable.

9. The proximity sensor mounting structure as set forth in claim 8, wherein the stopper axis portion is formed in a tapered shape with its diameter increasing in a direction getting away from the securing portion, and the stopper support is formed in a shape corresponding to the tapered shape of the stopper axis portion.

* * * * *